United States Patent
Nguyen et al.

(10) Patent No.: US 9,916,668 B2
(45) Date of Patent: Mar. 13, 2018

(54) METHODS AND SYSTEMS FOR IDENTIFYING BACKGROUND IN VIDEO DATA USING GEOMETRIC PRIMITIVES

(71) Applicant: Personify, Inc., Chicago, IL (US)

(72) Inventors: Cong Nguyen, Ho Chi Minh (VN); Quang Nguyen, Ho Ch Minh (VN); Dennis Lin, Chicago, IL (US)

(73) Assignee: Personify, Inc., Chicago, IL (US)

( * ) Notice: Subject to any disclaimer, the term of this patent is extended or adjusted under 35 U.S.C. 154(b) by 0 days.

(21) Appl. No.: 14/716,511

(22) Filed: May 19, 2015

(65) Prior Publication Data

US 2016/0343148 A1    Nov. 24, 2016

(51) Int. Cl.
| | | |
|---|---|---|
| *G06K 9/34* | (2006.01) | |
| *G06T 11/00* | (2006.01) | |
| *G06K 9/62* | (2006.01) | |
| *G06K 9/46* | (2006.01) | |
| *G06K 9/00* | (2006.01) | |
| *G06K 9/38* | (2006.01) | |
| *G06T 7/194* | (2017.01) | |

(Continued)

(52) U.S. Cl.
CPC ........ *G06T 11/001* (2013.01); *G06K 9/00718* (2013.01); *G06K 9/38* (2013.01); *G06K 9/4604* (2013.01); *G06K 9/4638* (2013.01); *G06K 9/4652* (2013.01); *G06K 9/6267* (2013.01); *G06T 7/12* (2017.01); *G06T 7/194* (2017.01); *H04N 5/2226* (2013.01)

(58) Field of Classification Search
USPC ....... 382/170, 224, 165, 154, 128, 201, 194, 382/173, 180; 345/420; 358/453, 1.9, 358/447; 707/665, 695, 769; 715/704, 715/255, 723
See application file for complete search history.

(56) References Cited

U.S. PATENT DOCUMENTS 5,001,558 A    3/1991  Burley et al.
5,022,085 A    6/1991  Cok
(Continued)

FOREIGN PATENT DOCUMENTS

WO    2013019259    2/2013

OTHER PUBLICATIONS

Lee, D.S., "Effective Gaussian Mixture Learning for Video Background Substraction", IEEE, May 2005.
(Continued)

*Primary Examiner* — Anh Do
(74) *Attorney, Agent, or Firm* — Invention Mine LLC

(57) ABSTRACT

Systems and methods for using geometric primitives to identify background in video data. In one embodiment, a method obtains video data depicting at least a portion of a user. The video data is processed with at least one persona identification module comprising a geometric primitive module for generating a first persona probability map at least in part by: detecting at least one geometric primitive within the video data; identifying a respective region within the video data associated with each of the at least one detected geometric primitives; and assigning the respective regions an increased background-probability in the first persona probability map; and outputting a persona image by extracting pixels from the video data based on the persona probability map.

19 Claims, 16 Drawing Sheets

(51) Int. Cl.
*G06T 7/12* (2017.01)
*H04N 5/222* (2006.01)

(56) References Cited

U.S. PATENT DOCUMENTS

| | | | |
|---|---|---|---|
| 5,117,283 A | 5/1992 | Kroos et al. | |
| 5,227,985 A | 7/1993 | DeMenthon | |
| 5,343,311 A | 8/1994 | Morag et al. | |
| 5,506,946 A | 4/1996 | Bar et al. | |
| 5,517,334 A | 5/1996 | Morag et al. | |
| 5,534,917 A | 7/1996 | MacDougall | |
| 5,581,276 A | 12/1996 | Cipolla et al. | |
| 5,631,697 A | 5/1997 | Nishimura et al. | |
| 5,687,306 A | 11/1997 | Blank | |
| 5,875,040 A * | 2/1999 | Matraszek | G06T 5/20 |
| | | | 358/1.9 |
| 6,119,147 A | 9/2000 | Toomey | |
| 6,125,194 A | 9/2000 | Yeh | |
| 6,150,930 A | 11/2000 | Cooper | |
| 6,288,703 B1 | 9/2001 | Berman | |
| 6,411,744 B1 | 6/2002 | Edwards | |
| 6,618,444 B1 | 9/2003 | Haskell | |
| 6,661,918 B1 | 12/2003 | Gordon et al. | |
| 6,664,973 B1 | 12/2003 | Iwamoto et al. | |
| 6,760,749 B1 | 7/2004 | Dunlap | |
| 6,798,407 B1 | 9/2004 | Benman | |
| 6,937,744 B1 | 8/2005 | Toyama | |
| 6,973,201 B1 | 12/2005 | Colmenarez | |
| 7,050,070 B2 | 5/2006 | Ida | |
| 7,124,164 B1 | 10/2006 | Chemtob | |
| 7,317,830 B1 | 1/2008 | Gordon et al. | |
| 7,386,799 B1 | 6/2008 | Clanton | |
| 7,420,590 B2 | 9/2008 | Matusik | |
| 7,463,296 B2 | 12/2008 | Sun | |
| 7,518,051 B2 | 4/2009 | Redmann | |
| 7,574,043 B2 | 8/2009 | Porikli | |
| 7,599,555 B2 | 10/2009 | McGuire | |
| 7,602,990 B2 | 10/2009 | Matusik | |
| 7,631,151 B2 | 12/2009 | Prahlad | |
| 7,633,511 B2 | 12/2009 | Shum | |
| 7,634,533 B2 | 12/2009 | Rudolph | |
| 7,668,371 B2 | 2/2010 | Dorai | |
| 7,676,081 B2 | 3/2010 | Blake | |
| 7,692,664 B2 | 4/2010 | Weiss | |
| 7,747,044 B2 | 6/2010 | Baker | |
| 7,755,016 B2 | 7/2010 | Toda et al. | |
| 7,773,136 B2 | 8/2010 | Ohyama et al. | |
| 7,821,552 B2 | 10/2010 | Suzuki et al. | |
| 7,831,087 B2 | 11/2010 | Harville | |
| 7,912,246 B1 | 3/2011 | Moon | |
| 8,094,928 B2 | 1/2012 | Graepel et al. | |
| 8,131,011 B2 | 3/2012 | Nevatia | |
| 8,146,005 B2 | 3/2012 | Jones | |
| 8,175,384 B1 | 5/2012 | Wang | |
| 8,204,316 B2 | 6/2012 | Panahpour Tehrani et al. | |
| 8,225,208 B2 | 7/2012 | Sprang | |
| 8,264,544 B1 | 9/2012 | Chang | |
| 8,300,890 B1 | 10/2012 | Gaikwad et al. | |
| 8,320,666 B2 | 11/2012 | Gong | |
| 8,335,379 B2 | 12/2012 | Malik | |
| 8,345,082 B2 | 1/2013 | Tysso | |
| 8,363,908 B2 | 1/2013 | Steinberg | |
| 8,379,101 B2 | 2/2013 | Mathe | |
| 8,396,328 B2 | 3/2013 | Sandrew et al. | |
| 8,406,494 B2 * | 3/2013 | Zhan | G06T 7/0028 |
| | | | 382/128 |
| 8,411,149 B2 | 4/2013 | Maison | |
| 8,411,948 B2 | 4/2013 | Rother | |
| 8,422,769 B2 | 4/2013 | Rother | |
| 8,437,570 B2 | 5/2013 | Criminisi | |
| 8,446,459 B2 | 5/2013 | Fang | |
| 8,446,488 B2 | 5/2013 | Yim | |
| 8,477,149 B2 | 7/2013 | Beato | |
| 8,503,720 B2 | 8/2013 | Shotton | |
| 8,533,593 B2 * | 9/2013 | Grossman | G11B 27/034 |
| | | | 715/255 |
| 8,533,594 B2 * | 9/2013 | Grossman | G06F 17/2288 |
| | | | 715/255 |
| 8,533,595 B2 * | 9/2013 | Grossman | G06F 3/0484 |
| | | | 715/255 |
| 8,565,485 B2 | 10/2013 | Craig et al. | |
| 8,588,515 B2 | 11/2013 | Bang et al. | |
| 8,625,897 B2 | 1/2014 | Criminisi | |
| 8,643,701 B2 | 2/2014 | Nguyen | |
| 8,649,592 B2 | 2/2014 | Nguyen | |
| 8,649,932 B2 | 2/2014 | Mian et al. | |
| 8,655,069 B2 | 2/2014 | Rother | |
| 8,659,658 B2 | 2/2014 | Vassigh | |
| 8,666,153 B2 | 3/2014 | Hung et al. | |
| 8,682,072 B2 | 3/2014 | Sengamedu | |
| 8,701,002 B2 * | 4/2014 | Grossman | G06F 17/30011 |
| | | | 715/255 |
| 8,723,914 B2 | 5/2014 | Mackie | |
| 8,818,028 B2 | 8/2014 | Nguyen et al. | |
| 8,854,412 B2 | 10/2014 | Tian | |
| 8,874,525 B2 * | 10/2014 | Grossman | G06F 17/2288 |
| | | | 707/665 |
| 8,890,923 B2 | 11/2014 | Tian | |
| 8,890,929 B2 | 11/2014 | Paithankar | |
| 8,913,847 B2 | 12/2014 | Tang et al. | |
| 8,994,778 B2 | 3/2015 | Weiser | |
| 9,008,457 B2 | 4/2015 | Dikmen | |
| 9,053,573 B2 | 6/2015 | Lin | |
| 9,065,973 B2 | 6/2015 | Graham | |
| 9,087,229 B2 | 7/2015 | Nguyen | |
| 9,088,692 B2 | 7/2015 | Carter | |
| 9,285,951 B2 | 3/2016 | Makofsky | |
| 9,542,626 B2 | 1/2017 | Martinson | |
| 9,659,658 B2 | 5/2017 | Kim | |
| 2002/0012072 A1 | 1/2002 | Toyama | |
| 2002/0025066 A1 | 2/2002 | Pettigrew | |
| 2002/0051491 A1 | 5/2002 | Challapali | |
| 2002/0158873 A1 | 10/2002 | Williamson | |
| 2004/0153671 A1 | 8/2004 | Schuyler et al. | |
| 2004/0175021 A1 * | 9/2004 | Porter | G06K 9/00228 |
| | | | 382/118 |
| 2005/0063565 A1 | 3/2005 | Nagaoka | |
| 2006/0072022 A1 | 4/2006 | Iwai | |
| 2006/0193509 A1 | 8/2006 | Criminisi | |
| 2006/0259552 A1 | 11/2006 | Mock | |
| 2006/0291697 A1 | 12/2006 | Luo | |
| 2007/0036432 A1 | 2/2007 | Xu | |
| 2007/0110298 A1 | 5/2007 | Graepel | |
| 2007/0133880 A1 | 6/2007 | Sun | |
| 2008/0181507 A1 | 7/2008 | Gope et al. | |
| 2008/0266380 A1 | 10/2008 | Gorzynski | |
| 2008/0273751 A1 | 11/2008 | Yuan | |
| 2009/0003687 A1 | 1/2009 | Agarwal | |
| 2009/0199111 A1 | 8/2009 | Emori | |
| 2009/0245571 A1 | 10/2009 | Chien | |
| 2009/0249863 A1 | 10/2009 | Kim | |
| 2009/0284627 A1 | 11/2009 | Bando et al. | |
| 2009/0300553 A1 | 12/2009 | Pettigrew | |
| 2010/0034457 A1 | 2/2010 | Berliner | |
| 2010/0046830 A1 | 2/2010 | Wang | |
| 2010/0053212 A1 | 3/2010 | Kang | |
| 2010/0128927 A1 | 5/2010 | Ikenoue | |
| 2010/0171807 A1 | 7/2010 | Tysso | |
| 2010/0302376 A1 | 12/2010 | Boulanger | |
| 2010/0329544 A1 | 12/2010 | Sabe | |
| 2011/0242277 A1 | 10/2011 | Do et al. | |
| 2011/0249190 A1 | 10/2011 | Nguyen | |
| 2011/0249863 A1 | 10/2011 | Ohashi | |
| 2011/0249883 A1 | 10/2011 | Can | |
| 2011/0267348 A1 | 11/2011 | Lin et al. | |
| 2012/0051631 A1 | 3/2012 | Nguyen | |
| 2012/0314077 A1 | 12/2012 | Clavenna, II | |
| 2013/0016097 A1 | 1/2013 | Coene | |
| 2013/0110565 A1 | 5/2013 | Means | |
| 2013/0129205 A1 | 5/2013 | Wang | |
| 2013/0142452 A1 | 6/2013 | Shionozaki | |
| 2013/0243313 A1 | 9/2013 | Civit | |
| 2013/0335506 A1 | 12/2013 | Carter | |
| 2014/0003719 A1 | 1/2014 | Bai | |
| 2014/0029788 A1 | 1/2014 | Kang | |

(56) References Cited

U.S. PATENT DOCUMENTS

| | | |
|---|---|---|
| 2014/0063177 A1 | 3/2014 | Tian |
| 2014/0112547 A1 | 4/2014 | Peeper |
| 2014/0119642 A1 | 5/2014 | Lee |
| 2014/0153784 A1 | 6/2014 | Gandolph |
| 2014/0300630 A1 | 10/2014 | Flider |
| 2014/0307056 A1 | 10/2014 | Romea |
| 2017/0208243 A1 | 7/2017 | Masad |

OTHER PUBLICATIONS

Benezeth et al., "Review and Evaluation of Commonly-Implemented Background Substraction Algorithm", 2008.

Piccardi, M., "Background Substraction Techniques: A Review", IEEE, 2004.

Cheung et al., "Robust Techniques for Background Substraction in Urban Traffic Video", 2004.

Kolmogorov et al., "Bi-Layer Segmentation of Binocular Stereo Vision", IEEE, 2005.

Gvili et al., "Depth Keying", 2003.

Crabb et al., "Real-Time Foreground Segmentation via Range and Color Imaging", 2008.

Wang, L., et al., "Tofcut: Towards robust real-time foreground extraction using a time-off camera.", Proc. of 3DPVT, 2010.

Xu, F., et al., "Human detection using depth and gray images", Advanced Video and Signal Based Surveillance, 2003., Proceedings, IEEE Conference on IEEE, 2003.

Zhang, Q., et al., "Segmentation and tracking multiple objects under occlusion from multiview video.", Image Processing, IEEE Transactions on 20.11 (2011), pp. 3308-3313.

Carsten, R., et al., "Grabcut: Interactive foreground extraction using iterated graph cuts", ACM Transactions on Graphics (TOG) 23.3 (2004), pp. 309-314.

Arbelaez, P., et ,al., "Contour detection and hierarchical image segmentation", Pattern Analysis and Machine Intelligence, IEEE Transactions on 33.4 (2011): 898-916.

Izquierdo' M. Ebroul. "Disparity/segmentation analysis: matching with an adaptive window and depth-driven segmentation." Circuits and Systems for Video Technology, IEEE Transactions on 9.4 (1999): 589-607.

Working screenshot of Snagit manufactured by Techsmith, released Apr. 18, 2014.

Yacoob, Y., et al., "Detection, analysis and matching of hair," in Computer Vision, 2005, ICCV 2005. Tenth IEEE International Conference, vol. 1., No., pp. 741-748, vol. 1, Oct. 17-21, 2005.

Talukder, A., et al., "Real-time detection of moving objects in a dynamic scene from moving robotic vehicles," in Intelligent Robots and Systems, 2003. (IROS 2003). Proceedings. 2003 IEEE/RSJ international Conference on, vol. 2, pp. 1308-1313, vol. 2, Oct. 27-31, 2003.

Sheasby, G., et al., "A robust stereo prior for human segmentation", In ACCV, 2012.

Hradis, M., et al., "Real-time Tracking of Participants in Meeting Video", Proceedings of CESCG, Wien, 2006.

* cited by examiner

METHODS AND SYSTEMS FOR IDENTIFYING BACKGROUND IN VIDEO DATA USING GEOMETRIC PRIMITIVES

BACKGROUND

Online data communications are quite prevalent and pervasive in modern society, and are becoming more so all the time. Moreover, developments in software, communication protocols, and peripheral devices (e.g., video cameras, three-dimension video cameras, and the like), along with developments in other computing disciplines, have collectively enabled and facilitated the inclusion of multimedia experiences as part of such communications. Indeed, the multimedia nature and aspects of a given communication session are often the focus and even essence of such communications. These multimedia experiences take forms such as audio chats, video chats (that are usually also audio chats), online meetings (e.g., web meetings), and of course many other examples could be listed as well.

Using the context of online meetings as an illustrative example, it is often the case that one of the participants in the video conference call is a designated presenter, and often this user opts to embed a digital representation of themselves (i.e., a persona) as part of the offered presentation. By way of example, the user may choose to have a video feed embedded into a power point presentation. In a simple scenario, the video feed may include a depiction of the user as well as background information. The background information may include a view of the wall behind the user as seen from the point of view of the video camera. If the user is outside, the background information may include buildings and trees. In more advanced versions of this video conferencing paradigm, the persona is isolated from the background information found in video feed. This allows viewers to experience a more natural sensation as the embedded persona they see within the presentation is not cluttered and surrounded by distracting and undesired background information.

OVERVIEW

Improvements over the above-described developments have recently been realized by technology that, among other capabilities and features, extracts what is known as a "persona" of a user from a video feed from a video camera that is capturing video of the user. The extracted persona, which in some examples appears as a depiction of part of the user (i.e., upper torso, shoulders, arms, hands, neck, and head) and in other examples appears as a depiction of the entire user. This technology is described in the following patent documents, each of which is incorporated in its respective entirety into this disclosure: (i) U.S. patent application Ser. No. 13/083,470, entitled "Systems and Methods for Accurate User Foreground Video Extraction," filed Apr. 8, 2011 and published Oct. 13, 2011 as U.S. Patent Application Pub. No. US 2011/0249190, (ii) U.S. patent application Ser. No. 13/076,264, entitled "Systems and Methods for Embedding a Foreground Video into a Background Feed based on a Control input," filed Mar. 30, 2011 and published Oct. 6, 2011 as U.S. Patent Application Pub. No. US2011/0242277, and (iii) unpublished U.S. patent application Ser. No. 14/145,874, entitled "System and Methods for Persona Identification Using Combined Probability Maps," filed Dec. 31, 2013, since published on Jul. 2, 2015 as U.S. Patent Application Pub. No. US2015/0187076.

Facilitating accurate and precise extraction of the persona, especially the hair of the persona, from a video feed is not a trivial matter. As mentioned, persona extraction is carried out with respect to video data that is received from a camera that is capturing video of a scene in which the user is positioned. The persona-extraction technology substantially continuously (e.g., with respect to each frame) identifies which pixels represent the user and which pixels do not, and accordingly generates "alpha masks" (e.g., generates an alpha mask for each frame), where a given alpha mask may take the form of or at least include an array with a respective stored data element corresponding to each pixel in the corresponding frame, where such stored data elements are individually and respectively set equal to 1 (one) for each user pixel and to 0 (zero) for every other pixel (i.e., for each non-user (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8-bit number that can be set equal to any integer that is (i) greater than or equal to zero and (ii) less than or equal to 255. Moreover, a typical RGBA implementation provides for such an 8-bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

When merging an extracted persona with content, the above-referenced persona-based technology creates the above-mentioned merged display in a manner consistent with these conventions; in particular, on a pixel-by-pixel (i.e., pixel-wise) basis, the merging is carried out using pixels from the captured video frame for which the corresponding alpha-mask values equal 1, and otherwise using pixels from the content. Moreover, it is noted that pixel data structures typically also include or are otherwise associated with one or more other values corresponding respectively to one or more other properties of the pixel, where brightness is an example of one such property. In some embodiments, the brightness value is the luma component of the image or video frame. In other embodiments, the brightness value is the pixel values of one of an R, G, or B color channel, or other similar color space (e.g., gamma compressed RGB, or R'G'B', or YUV, or YCbCr, as examples). In other embodiments, the brightness value may be a weighted average of pixel values from one or more color channels. And other approaches exist as well.

This disclosure describes systems and methods for identifying background in video data using geometric primitives. Such systems and methods are useful for scenarios in which a user's persona is to be extracted from a video feed, for example, in an online "panel discussion" or more generally an online meeting or other online communication session. The present systems and methods facilitate natural interaction by enabling rapid identification of non-persona video data, a particularly troublesome aspect of a comprehensive user extraction process. Obviously, in any persona extraction process, it is just as useful to confirm non-persona (background) pixels as it is to confirm persona (foreground) pixels. The present systems and methods therefore provide an advanced approach for identifying background regions in video data using geometric primitives, which may in turn be used in the context of a comprehensive persona extraction process.

One embodiment of the systems and methods disclosed herein takes the form of a process. The process includes obtaining video data depicting at least a portion of a user. The process also includes detecting at least one geometric primitive within the video data. The at least one detected geometric primitive is a type of geometric primitive included in a set of geometric-primitive models. The process also includes identifying a respective region within the video data associated with each detected geometric primitive. The process also includes classifying each respective region as background of the video data.

In at least one embodiment, obtaining the video data includes obtaining the video data via a video camera. The video data may include one or more frames of color images. In at least one embodiment, obtaining the video data includes obtaining the video data via a depth camera. The video data may include one or more frames of depth images. In at least one embodiment, obtaining the video data includes obtaining the video data via a 3-D camera. The video data may include one or more frames of 3-D images. In at least one embodiment, obtaining the video data includes obtaining the video data from a data store. The video data may be obtained via one or more of the above listed sources.

In at least one embodiment, the set of geometric-primitive models includes a straight line. In one such embodiment, at least one of the detected geometric primitives is a straight line and the respective region within the video data associated with the detected straight line is a rectangle. In some instances, the rectangle has a length that is equal to a length of the detected straight line and is bisected by the detected straight line. In other instances, the rectangle has a length that is less than a length of the detected straight line and is bisected by the detected straight line.

In at least one embodiment, the set of geometric-primitive models includes a straight line longer than a threshold length. In one such embodiment, at least one of the detected geometric primitives is a straight line longer than the threshold length and the respective region within the video data associated with the detected straight line is a rectangle. In some instances, the rectangle has a length that is equal to a length of the detected straight line and is bisected by the detected straight line. In other instances, the rectangle has a length that is less than a length of the detected straight line and is bisected by the detected straight line.

In at least one embodiment, the set of geometric-primitive models includes an angle. In one such embodiment, at least one of the detected geometric primitives is an angle. In some embodiments, the respective region within the video data associated with the detected angle is a triangle that is made up of two line segments that form the detected angle and one line segment that connects the two line segments that form the detected angle. In some embodiments, the respective region within the video data associated with the detected angle is a sub-region of a triangle that is made up of two line segments that form the detected angle and one line segment that connects the two line segments that form the detected angle. The sub-region may be a quadrilateral sub-region formed by two triangular sub-regions sharing one common side.

In at least one embodiment, the set of geometric-primitive models include an angle within a threshold tolerance of being a right angle. In one such embodiment, at least one of the detected geometric primitives is an angle within the threshold tolerance. In some embodiments, the respective region within the video data associated with the detected angle is a triangle that is made up of two line segments that form the detected angle and one line segment that connects the two line segments that form the detected angle. In some embodiments, the respective region within the video data associated with the detected angle is a sub-region of a triangle that is made up of two line segments that form the detected angle and one line segment that connects the two line segments that form the detected angle. The sub-region may be a quadrilateral sub-region formed by two triangular sub-regions sharing one common side.

In at least one embodiment, the set of geometric-primitive models includes an angle made up of two line segments, wherein each of the two line segments is longer than a threshold length. In one such embodiment, at least one of the detected geometric primitives is an angle made up of two line segments, wherein each of the two line segments is longer than the threshold length. In some embodiments, the respective region within the video data associated with the detected angle is a triangle that is made up of two line segments that form the detected angle and one line segment that connects the two line segments that form the detected angle. In some embodiments, the respective region within the video data associated with the detected angle is a sub-region of a triangle that is made up of two line segments that form the detected angle and one line segment that connects the two line segments that form the detected angle. The sub-region may be a quadrilateral sub-region formed by two triangular sub-regions sharing one common side.

In at least one embodiment, identifying a respective region within the video data associated with each detected geometric primitive includes obtaining an indication of a foreground region of the video data and selecting a respective region within the video data for each detected geometric primitive that does not include any portion of the indicated foreground region.

In at least one embodiment, classifying each respective region as background of the video data includes employing an alpha mask to classify each respective region as background of the video data. In at least one such embodiment, the alpha mask is made up of Boolean indicators (e.g., binary values). In at least one other embodiment, the alpha mask is made up of background-likelihood indicators (e.g., log-likelihood values).

In at least one embodiment, the method further includes generating a background-color model at least in part by using at least one identified respective region. In at least one such embodiment, generating the background-color model includes (i) identifying a respective color of at least one pixel included in the at least one identified respective region and (ii) adding to the background-color model the identified respective color of the at least one pixel. In some embodiments, generating the background-color model includes (i) identifying a respective color of each pixel included in the at least one identified respective regions and (ii) adding to the background-color model the identified respective colors of the pixels.

In at least one embodiment, the method further includes updating a background-color model at least in part by using at least one identified respective region. In at least one such embodiment, updating the background-color model includes (i) identifying a respective color of at least one pixel included in the at least one identified respective region and (ii) adding to the background-color model the identified respective color of the at least one pixel. In some embodiments, updating the background-color model includes (i) identifying a respective color of each pixel included in the at least one identified respective regions and (ii) adding to the background-color model the identified respective colors of the pixels.

At a high level, the systems and processes described herein use geometric primitive detection and novel processing techniques to identify one or more background regions of video data. The video data depicts at least a portion of a user. The video data may depict a portion of the user (e.g., from the shoulders up) or the entire user. The user may or may not have hair on the top of their head. Identification of background regions using geometric primitive detection helps determine which pixels (i.e., pixels of the video data) are not part of the user. In some cases the classification of each respective region takes the form of an alpha mask as described previously. In other examples, the classification of each respective region associates pixels of the video data with a respective background-likelihood value (e.g., a respective log-likelihood ratio). An indication of the background-classified regions may in turn be used as part of a comprehensive user extraction process.

At least part of the motivation behind the systems and processes described herein is the realization that a depicted persona will not comprise certain geometric primitives. Clearly defined angles and straight lines are not typically found in the human form, and therefore can be assumed to not be part of a to-be-extracted persona if detected within the video data.

The set of geometric-primitive models is a construct which contains one or more archetypal geometric primitives that the systems and methods described herein will look to detect within the video data. The set of geometric-primitive models may include any geometric primitive model. Some useful examples may include right angles, long straight lines, squares, triangles, circles, contours, and the like. The set of geometric primitive models should define shapes or geometric structures that are unlikely to be part of a depicted persona.

A user-hair-color model and a background-color model may each take on a plurality of forms. In general each model is used to indicate which colors are representative of a user-hair color and background of the video data respectively. The models may take on the form of a histogram, a Gaussian mixture, an array of color values and respective color counts, and the like.

In general, any indication, classification, assignment, and the like of pixels, regions, portions, and the like of the video data is relevant within the scope of the systems and processes described herein. As this disclosure describes systems and processes that may be used as part of a comprehensive user-extraction process, it is explicitly noted that it is not required that any classification of pixels as foreground or background be definitive with respect to the entire user-extraction process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
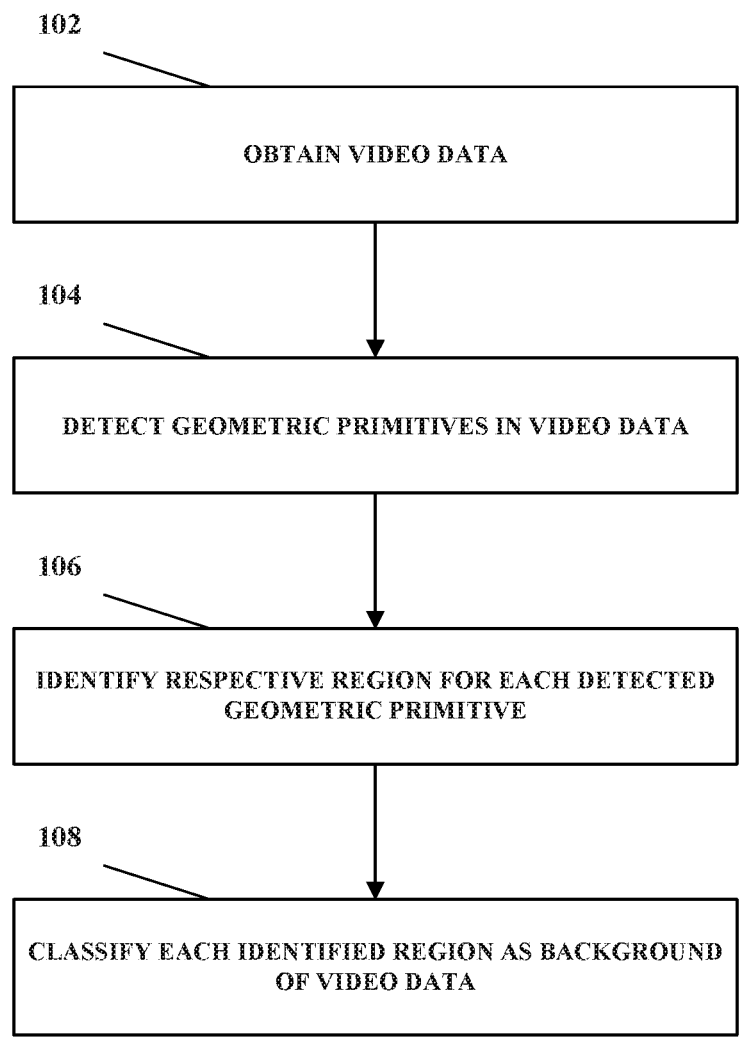
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

Figure 16:
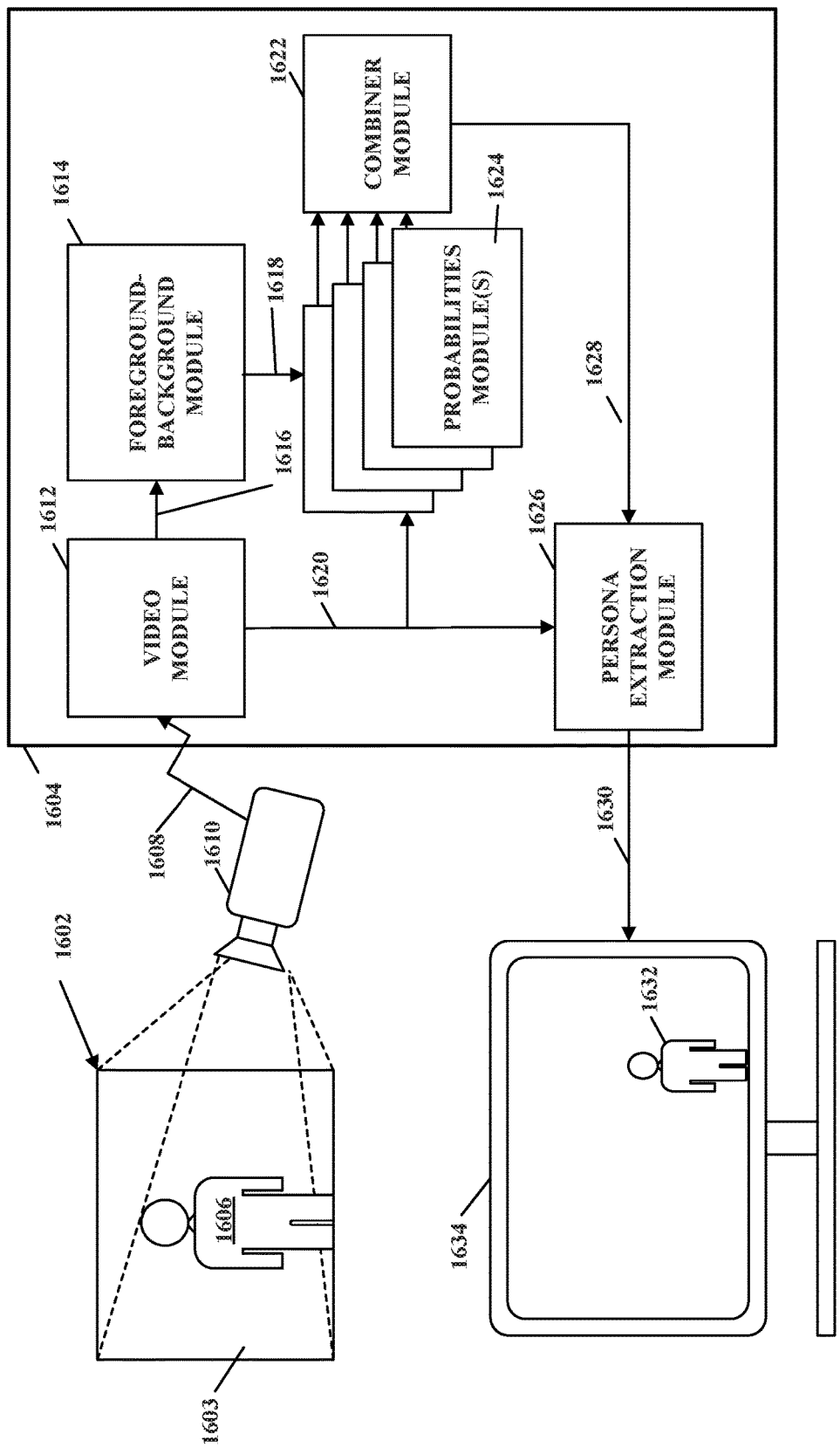
FIG. 16 depicts an image capture and persona-processing apparatus.

FIG. 16 depicts a camera 1610 capturing an image of scene 1602 that includes a person 1606 and her surroundings 1603. The camera 1610 may use any one of a number of different image depth determination technologies to generate image depth data, including time-of-flight, structured light, and stereoscopic imaging. The camera 1610 provides image data over connection 1608 to a computing device 1604. The image data may include frames of image pixel data and corresponding image depth data. In some embodiments, the camera may be configured with sufficient signal processing hardware resources to generate the image depth data, while in other embodiments, the signal processing hardware resources may reside in computing device 1604, such as in video module 1612. The camera 1610 may be an external peripheral device connected via a Universal Serial Bus (USB) connection or may be more highly-integrated into computing device 1604.

Computing device 1604 may take the form of a desktop computer, laptop computer, tablet computer, smart phone, or the like. In the embodiment shown in FIG. 16, in includes a video module 1612, a foreground-background module 1614, persona identification modules 1624, a combiner module 1622, and a persona extraction module 1626. The computing device 1604 may then provide a video output over communication link 1630 for display on display device 1634. The video output includes image data of a persona 1632 representative of the person 1606, but without the background image data associated with the background 1604 from the scene 1602.

The preceding paragraph is an example of the fact that, in the present disclosure, various elements of one or more of the described embodiments are referred to as modules that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module may also include instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

The persona ID modules 1624 operate on the depth data as shown by arrow 1616, nm the foreground-background map as shown by connection 1618, or on the image pixel data shown by connection 1620, or on both the foreground-background map and the image pixel data. Each of the persona ID modules 1624 generates a probability map indicating a likelihood that the respective pixels are part of a foreground image as compared to a background image.

The persona ID modules, as described more fully below, are configured to operate on certain characteristics of the image and/or depth data to identify characteristics of the data indicative of a person's presence in the scene 1602. The respective probability maps are then combined by combiner module 1622 to provide an aggregate probability map. In some embodiments, the individual probability maps are in the form of a log-likelihood ratio:

$$\log_{10}\left(\frac{P(f|x)}{P(b|x)}\right),$$

which represents the logarithm of the ratio of the probability that the pixel "x" is a foreground ("f") pixel versus a background ("b") pixel. Thus, a value of 1 represents a likelihood that the pixel being in the foreground is ten times more likely than being in the background, a value of −1 represents a likelihood that the pixel being in the background is ten times that of being in the foreground, while a value of 0 represents and equal likelihood of a pixel being in the foreground or background (that is, a likelihood ratio of 1 has a loglikelihood of 0). In such an embodiment, the combiner module 1622 may combine the probability maps by forming a weighted sum of the plurality of maps on a pixel-by-pixel basis. Note that the probability maps need not be rigorously derived from probability theory, but may also be based on heuristic algorithms that provide approximations of relative likelihoods of a pixel being either a foreground or background pixel.

In some embodiments, the present systems and methods relate to a persona ID module 1624 which may operate, as previously discussed, by seeking to identify background regions or pixels in a frame of pixel data from video data using geometric primitives, which may in turn be used in the context of a comprehensive persona extraction process.

The persona extraction module 1626 of computing device 1604 may operate on the aggregate persona probability map as indicated from line 1628 from combiner module 1622. In one embodiment, a graph cut utility (such as what is available from within the OpenCV library) may be utilized. In such an embodiment, the segmentation of the persona extraction may be formulated as a mincut/maxflow problem. In this case, the image is mapped into a graph, and each pixel is mapped to a node. In addition, there are two additional special nodes called the source and the sink. The node for each image pixel is connected to both the source and the sink. If the aggregate persona probability map indicates that that pixel is likely to be foreground, a weight is applied to the edge linking the pixel to the source. If the aggregate persona probability map indicates that that pixel is likely to be background, a weight is applied to the edge linking the pixel to the sink. The magnitude of the weight increases as the probability becomes more certain. In addition, edges are included that link the nodes for a pixel to the nodes of a neighboring pixel. The weights of these nodes are inversely proportional to the likelihood of a boundary appearing there. One possible technique is to set these weights to be large if the two pixels are similar in color and set them to be small if the two pixels are not. Thus, transitioning from foreground to background is favored in areas where the color is also changing. The mincut problem is then solved by configuring the algorithm to remove edges from the graph until the source is no longer connected to the sink. (The algorithm will minimize the total weight of the edges it removes.) Since the node for each pixel is connected to both the source and the sink, one of those edges must be removed by the cut. If the node remains connected to the source (the edge to the sink was removed), that pixel is marked as foreground. Otherwise, the node is connected to the sink (the edge to the source was removed), and that pixel is marked as background. The formulation described may be solved efficiently through a variety of techniques.

FIG. 1 depicts an example process, in accordance with at least one embodiment. In particular, FIG. 1 depicts an example process 100 that includes elements 102-108. Although primarily depicted and described as being performed serially, at least a portion of the elements (steps) of the process 100 may be performed contemporaneously, or in a different order than is depicted in and described in connection with FIG. 1. Furthermore, in at least one embodiment, the process 100 is repeated, at some point in time, after any of the elements 102-108 are completed. Additionally, repetition of the process 100 may or may not include performance of each element in the process 100, and may commence at any of the elements 102-108. The process 100 is further described below.

One embodiment takes the form of the process 100. The process 100 includes obtaining video data depicting at least a portion of a user. The process 100 also includes detecting at least one geometric primitive within the video data. The at least one detected geometric primitive is a type of geometric primitive included in a set of geometric-primitive models. The process 100 also includes identifying a respective region within the video data associated with each detected geometric primitive. The process 100 also includes classifying each respective region as background of the video data.

At element 102 the process 100 includes obtaining video data depicting at least a portion of a user. In at least one embodiment, obtaining the video data includes obtaining the video data via a video camera. The video data may include one or more frames of color images. In at least one embodiment, obtaining the video data includes obtaining the video data via a depth camera. The video data may include one or more frames of depth images. In at least one embodiment, obtaining the video data includes obtaining the video data via a 3-D camera. The video data may include one or more frames of 3-D images. In at least one embodiment, obtaining the video data includes obtaining the video data from a data store. The video data may be obtained via one or more of the above listed sources.

At element 104 the process 100 includes detecting at least one geometric primitive within the video data. The at least one detected geometric primitive is a type of geometric primitive included in a set of geometric-primitive models.

At element 106 the process 100 includes identifying a respective region within the video data associated with each detected geometric primitive.

At element 108 the process 100 includes classifying each respective region as background of the video data. In at least one embodiment, classifying each respective region as background of the video data includes employing an alpha mask to classify each respective region as background of the video data. In at least one such embodiment, the alpha mask is made up of Boolean indicators. In at least one other embodiment, the alpha mask is made up of background-likelihood indicators.

Figure 2:
FIG. 2 depicts a first example frame of video data, in accordance with an embodiment.

FIG. 2 depicts a first example frame of video data, in accordance with an embodiment. In particular, FIG. 2 depicts video data 202. The video data 202 is a single frame of image information. The video data 202 may be a single frame of depth data, color data or a combination of the two (e.g., a single frame of 3-D image data). The video data 202 depicts a user 204 and a bookcase 206. The systems and processes described herein may be used to identify non-persona regions (i.e., background) as part of a comprehensive user 204 persona-extraction process.

In at least one embodiment, obtaining the video data 202 includes obtaining the video data 202 via a video camera. In at least one embodiment, obtaining the video data 202 includes obtaining the video data 202 via a depth camera. In at least one embodiment, obtaining the video data 202 includes obtaining the video data 202 via a 3-D camera. In at least one embodiment, obtaining the video data 202 includes obtaining the video data 202 from a data store.

Figure 3:
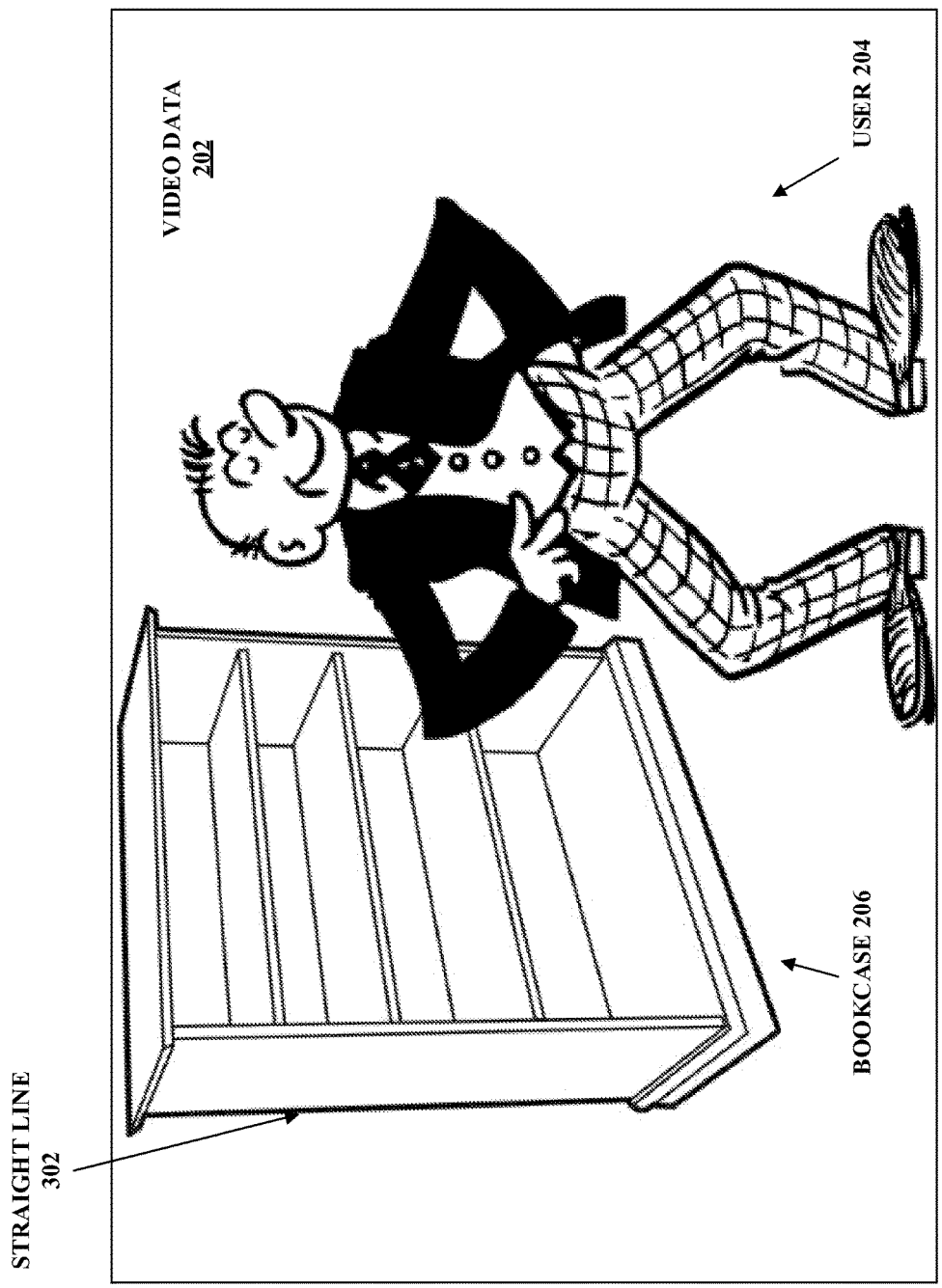
FIG. 3 depicts a first example detected straight line, in accordance with an embodiment.

FIG. 3 depicts a first example detected straight line, in accordance with an embodiment. In particular, FIG. 3 depicts the video data 202 of FIG. 2 with a detected straight line 302. The detected straight line 302 is an edge of the bookcase 206. Various methods can be used to detect the straight line 302 within the video data 202. Numerous methods, such as edge detection using high-frequency-information recognition, are known by those with skill in the relevant art and it would be understood how to implement any of the known techniques for detecting straight lines within the video data 202 in the context of the disclosure herein.

In at least one embodiment, the set of geometric-primitive models includes a straight line. In such an embodiment, the systems and methods described herein include detecting, if present within the video data 202, one or more straight lines (such as the detected straight line 302). In some cases every straight line within the video data is detected. This case is not depicted in any of the FIGS. due to the visual complexity, however it would be understood by those with skill in the art how to do so. In other embodiments not every straight line within the video data is detected, of which FIG. 3 is an example.

In at least one embodiment, the set of geometric-primitive models includes a straight line longer than a threshold length. In such an embodiment, the systems and methods described herein include detecting, if present within the video data 202, one or more straight lines that are each longer than the threshold length. In some cases every straight line that is longer than the threshold length within the video data 202 is detected. In other embodiments not every straight line within the video data 202 is detected. In some formulation of this embodiment, every straight line depicted in the video data 202 is detected, and those detected straight lines that are not longer than the threshold are thereafter disregarded. Stated formally, in some embodiments, detecting, if present within the video data 202, one or more straight lines that are each longer than the threshold length includes (i) detecting, if present within the video data 202, one or more straight lines and (ii) disregarding those detected straight lines that are not longer than the threshold length.

Figure 4:
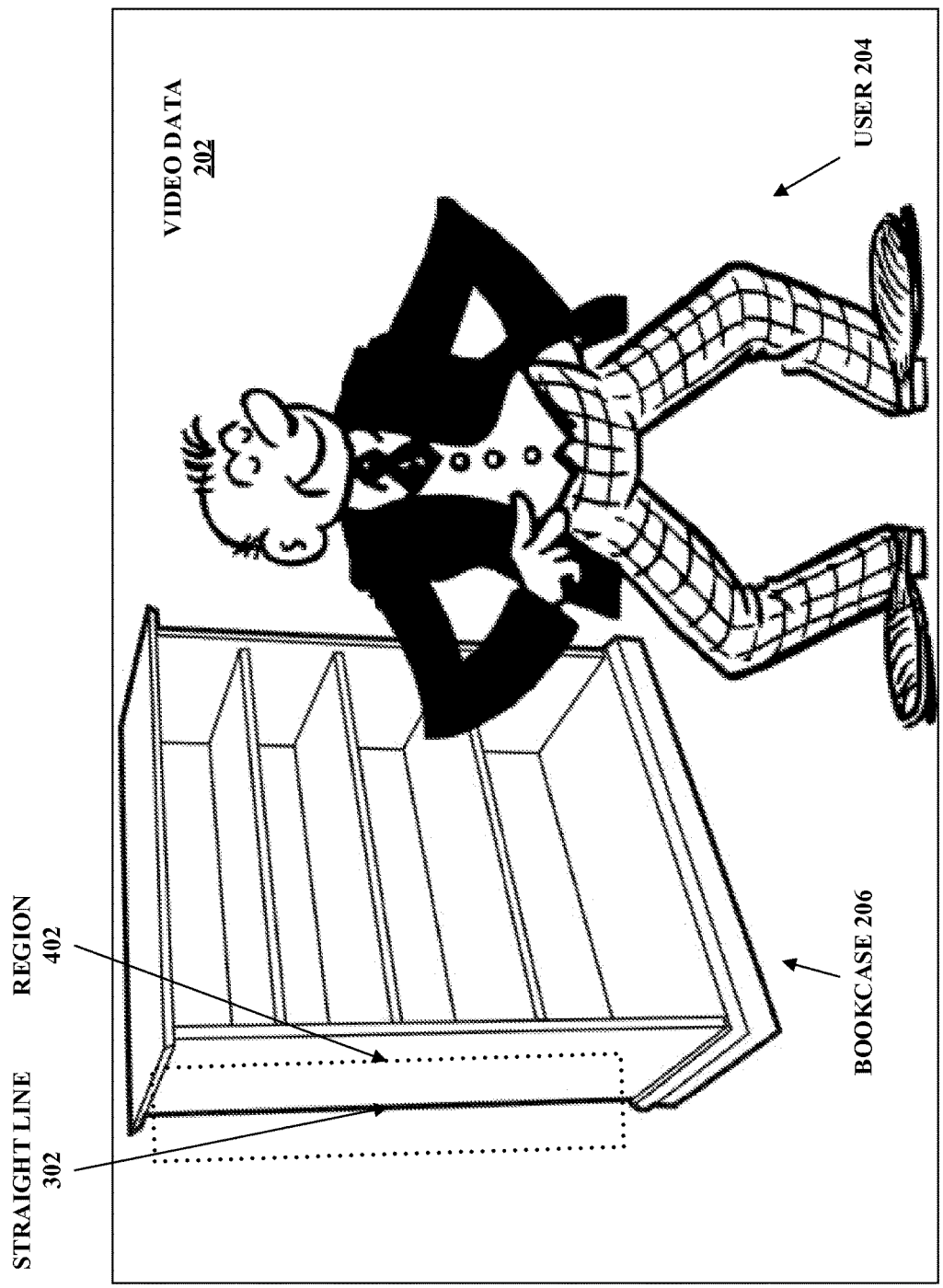
FIG. 4 depicts a first example identified region associated with the first example detected straight line of FIG. 3, in accordance with an embodiment.

FIG. 4 depicts a first example identified region associated with the first example detected straight line of FIG. 3, in accordance with an embodiment. In particular, FIG. 4 depicts the video data 202 of FIG. 2 and the detected straight line 302 of FIG. 3. FIG. 4 further depicts an identified region 402 associated with the detected straight line 302. An identified region associated with the detected straight line 302 may take on a plurality of shapes, a few examples of which are described below.

In at least one embodiment, as depicted in FIG. 4, the region 402, within the video data 202, associated with the detected straight line 302 is a rectangle. In some instances, as depicted in FIG. 4, the rectangle (i.e., the region 402) has a length that is equal to a length of the detected straight line 302. In some instances, as depicted in FIG. 4, the rectangle (i.e., the region 402) is bisected by the detected straight line 302. In other instances not depicted in any of the FIGS., the rectangle (i.e., the region 402) has a length that is equal to the length of the detected straight line and is not bisected by the detected straight line 302.

The width of the region 402 is such that (i) the entirety of the detected straight line 302 as well as (ii) parts of the video data 202 that border the sides of the depicted straight line 302 are included within the region 402.

Figure 5:
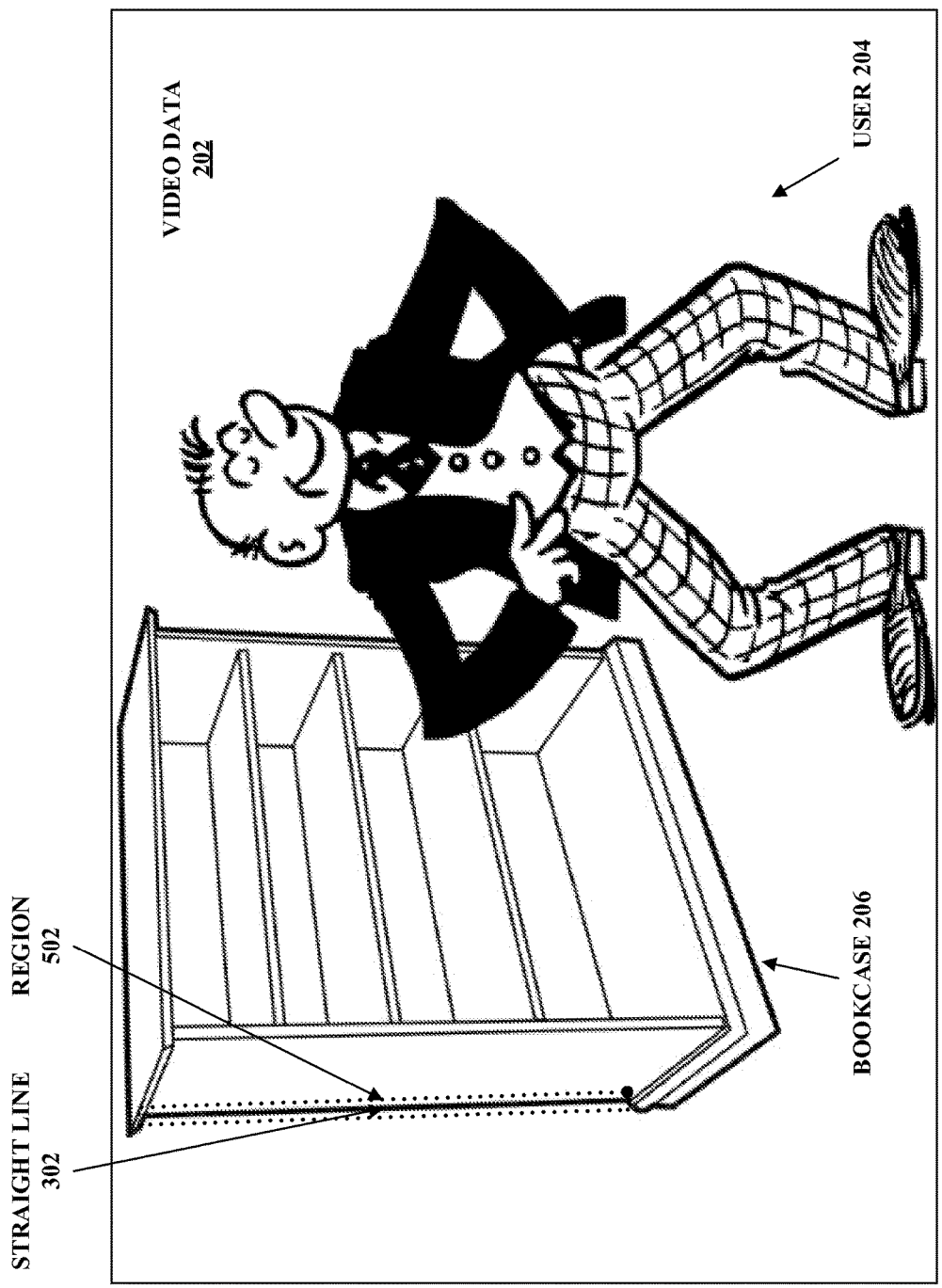
FIG. 5 depicts a second example identified region associated with the first example detected straight line of FIG. 3, in accordance with an embodiment.

FIG. 5 depicts a second example identified region associated with the first example detected straight line of FIG. 3, in accordance with an embodiment. In particular, FIG. 5 depicts the video data 202 of FIG. 2 and the detected straight line 302 of FIG. 3. FIG. 5 further depicts an identified region 502 associated with the detected straight line 302. An identified region associated with the detected straight line 302 may take on a plurality of shapes.

In at least one embodiment, as depicted in FIG. 5, the region 502, within the video data 202, associated with the detected straight line 302 is a rectangle. In some instances, as depicted in FIG. 5, the rectangle (i.e., the region 502) has a length that is equal to a length of the detected straight line 302. In some instances, as depicted in FIG. 5, the rectangle (i.e., the region 502) is bisected by the detected straight line 302.

The width of the region 502 is such that the entirety of the detected straight line 302 is included within the region 502 however, no other portion of the video data 202 is included within the region 502.

Figure 6:
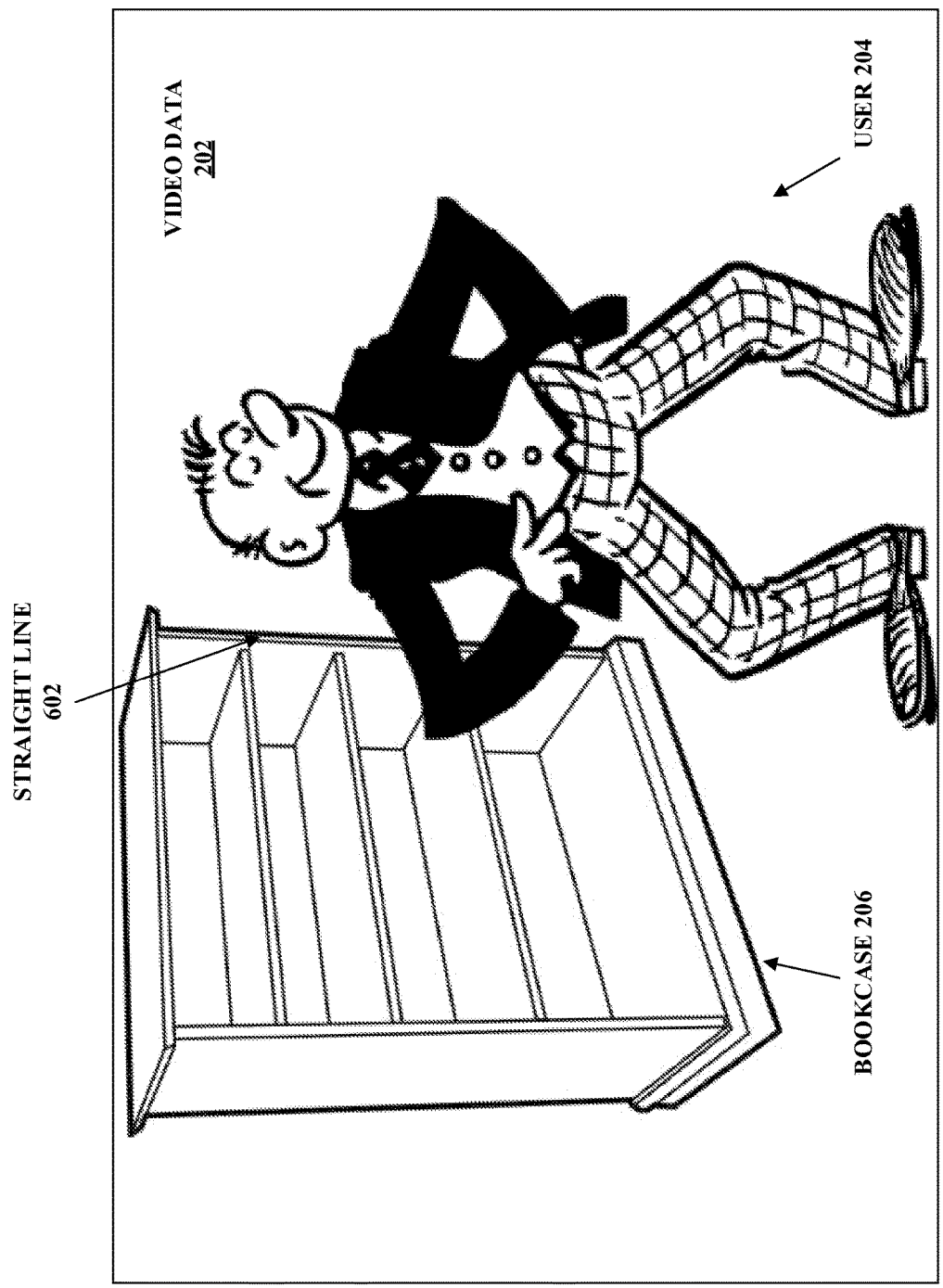
FIG. 6 depicts a second example detected straight line, in accordance with an embodiment.

FIG. 6 depicts a second example detected straight line, in accordance with an embodiment. In particular, FIG. 6 depicts the video data 202 of FIG. 2 with a detected straight line 602. The detected straight line 602 is an edge of the bookcase 206. The detected straight line 602 ends at an arm of the user 204. Various methods can be used to detect the straight line 602 within the video data 202. Numerous methods, such as edge detection using high-frequency-information recognition, are known by those with skill in the relevant art and it would be understood how to implement any of the known techniques for detecting straight lines within the video data 202 in the context of the disclosure herein.

In at least one embodiment, the set of geometric-primitive models includes a straight line. In such an embodiment, the systems and methods described herein include detecting, if present within the video data 202, one or more straight lines (such as the detected straight line 602). In some cases every straight line within the video data is detected. This case is not depicted in any of the FIGS. due to the visual complexity, however it would be understood by those with skill in the art how to do so. In other embodiments not every straight line within the video data is detected, of which FIG. 6 is an example.

The example described with respect to FIG. 6 is similar to the example described with respect to FIG. 3 however, in FIG. 6 an end of the detected straight line 602 coincides with a portion of the user 204, specifically the arm of the user 204. In certain embodiments, the systems and processes described herein include obtaining an indication of a foreground region of the video data 202. In one example, the arm of the user 204 is indicated as, or is indicated as part of the foreground region of the video data 202.

Figure 7:
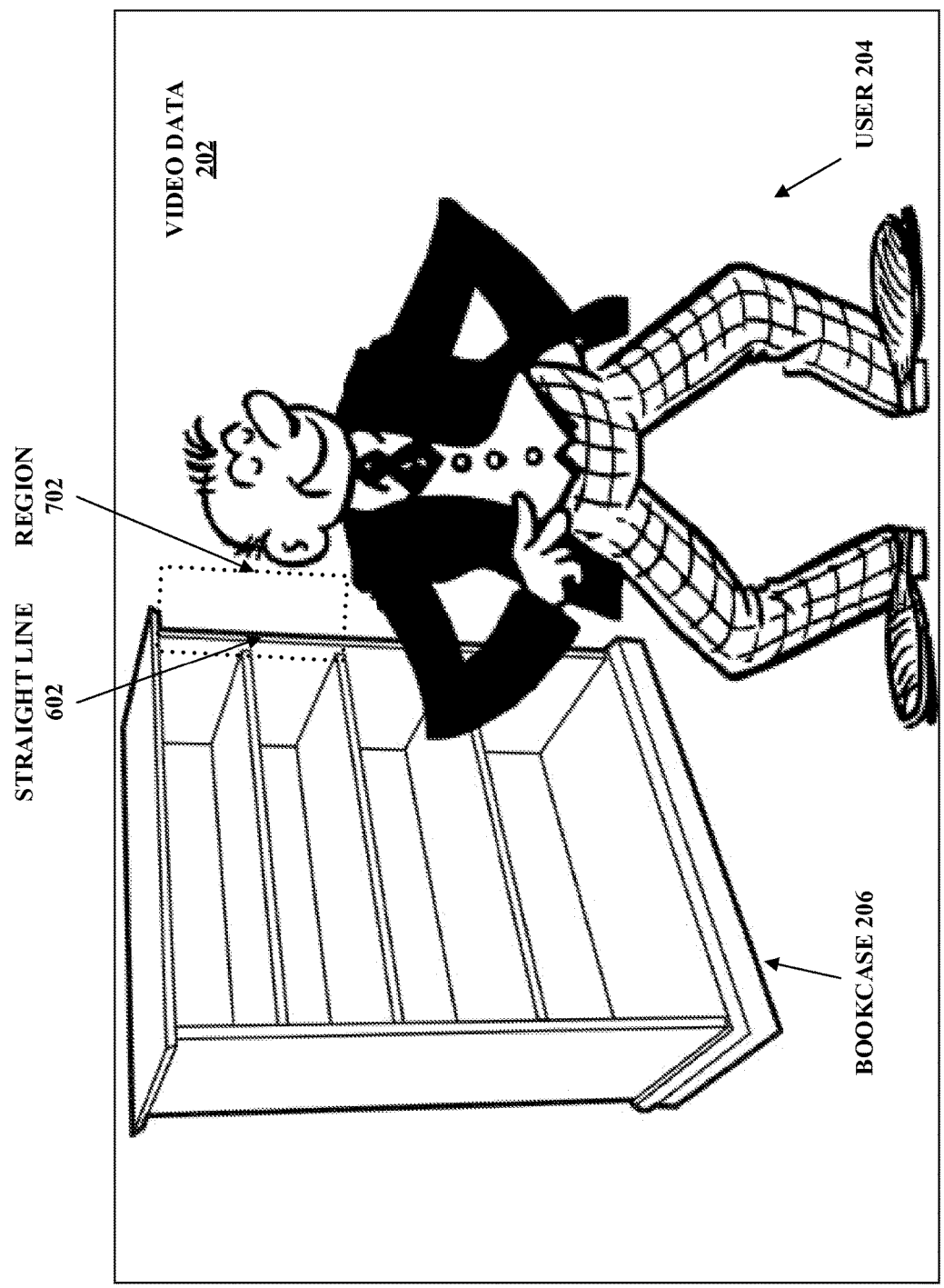
FIG. 7 depicts a first example identified region associated with the second example detected straight line of FIG. 6, in accordance with an embodiment.

FIG. 7 depicts a first example identified region associated with the second example detected straight line of FIG. 6, in accordance with an embodiment. In particular, FIG. 7 depicts the video data 202 of FIG. 2 and the detected straight line 602 of FIG. 6. FIG. 7 further depicts an identified region 702 associated with the detected straight line 602. An identified region associated with the detected straight line 602 may take on a plurality of shapes, a few examples of which are described below.

In at least one embodiment, as depicted in FIG. 7, the region 702, within the video data 202, associated with the detected straight line 602 is a rectangle. In some instances, as depicted in FIG. 7, the rectangle (i.e., the region 702) has a length that is less than a length of the detected straight line 602. In some instances, as depicted in FIG. 7, the rectangle (i.e., the region 702) is not bisected by the detected straight line 602. In other instances not depicted in any of the FIGS., the rectangle (i.e., the region 702) has a length that is less than the length of the detected straight line and is bisected by the detected straight line 602.

The width of the region 702 is such that (i) the entirety of the detected straight line 602 as well as (ii) parts of the video data 202 that border the sides of the depicted straight line 602 are included within the region 702.

As stated previously, in one scenario, the arm of the user 204 is indicated as, or is indicated as part of the foreground region of the video data 202. One example motivation behind identifying the rectangle (i.e., the region 702) to have a length that is less than the length of the detected straight line 602 is to prevent the indicated foreground region of the video data 202 from being included within the identified region 702. FIG. 7 shows such an example because, if all other variable remain constant and the length of the rectangle (i.e., the region 702) has a length that is equal to the length of the detected straight line 602, then the region 702 would include the indicated foreground region (i.e., the arm of the user 204).

Figure 8:
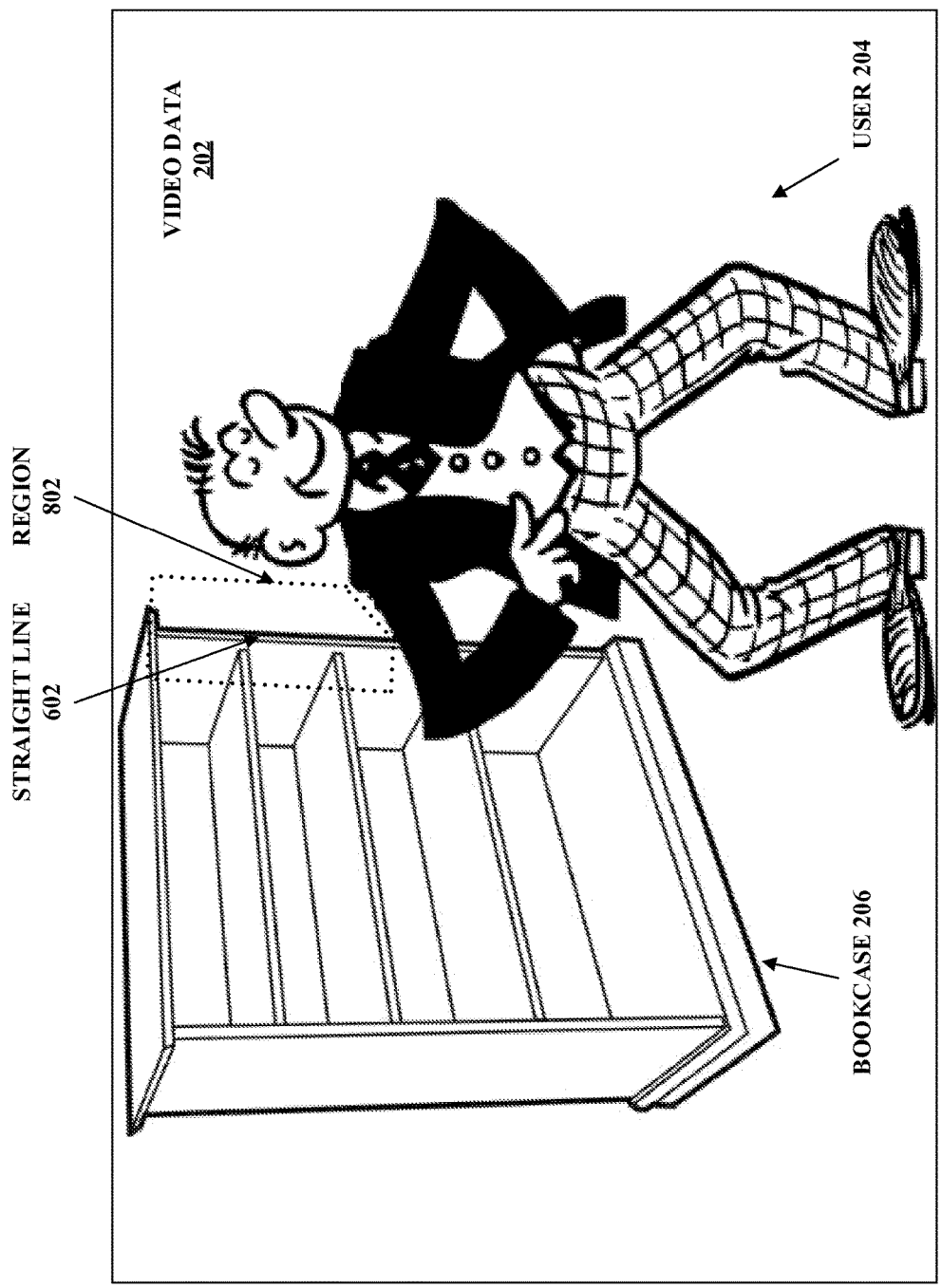
FIG. 8 depicts a second example identified region associated with the second example detected straight line of FIG. 6, in accordance with an embodiment.

FIG. 8 depicts a second example identified region associated with the second example detected straight line of FIG. 6, in accordance with an embodiment. In particular, FIG. 8 depicts the video data 202 of FIG. 2 and the detected straight line 602 of FIG. 6. FIG. 8 further depicts an identified region 802 associated with the detected straight line 602.

In at least one embodiment, as depicted in FIG. 8, the region 802, within the video data 202, associated with the detected straight line 602 is not a rectangle. In some instances, as depicted in FIG. 8, the region 802 has a length that is equal to a length of the detected straight line 602. The width of the region 802 is such that (i) the entirety of the detected straight line 602 as well as (ii) parts of the video data 202 that border the sides of the depicted straight line 602 are included within the region 802.

As stated previously, in one scenario, the arm of the user 204 is indicated as, or is indicated as part of the foreground region of the video data 202. One example motivation behind identifying the region 802 to be not a rectangle is to prevent the indicated foreground region of the video data 202 from being included within the identified region 802. FIG. 8 shows such an example.

The shape of the region 802 may have been determined through use of a multi-step approach. In a first step, a rectangle with a length equal to that of the detected straight line 602 is selected. In a second step, any portion of the selected rectangle that overlaps with any indicated foreground (e.g., the arm of the user 204) is deselected. The remaining selected region is identified as the region 802 (i.e., the remaining selected region is the identified region associated with the detected straight line 602).

Figure 9:
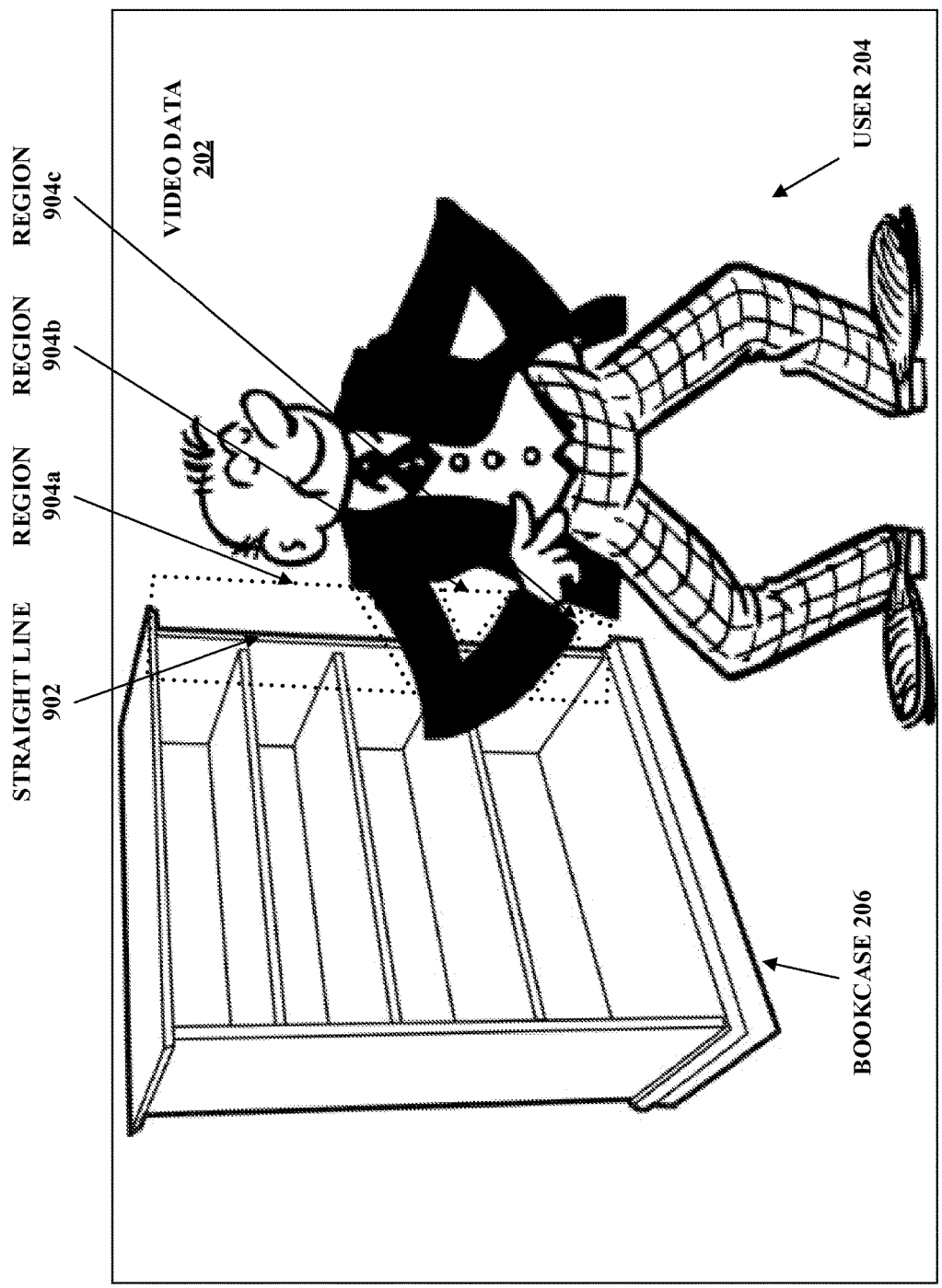
FIG. 9 depicts a first example detected interpolated straight line and an example identified disjointed region, in accordance with an embodiment.

FIG. 9 depicts a first example detected interpolated straight line and an example identified disjointed region, in accordance with an embodiment. In particular, FIG. 9 depicts the video data 202 of FIG. 2 and a detected interpolated straight line 902. FIG. 8 further depicts an identified disjointed region made up of sub-regions 904a-c associated with the detected interpolated straight line 902. The detected interpolated straight line 902 does not terminate at the arm of the user 204 like the detected straight line 602. Instead, the systems and processes described herein determine that the detected interpolated straight line 902 extends past the arm of the user 204 and terminates at the bottom of the bookcase 206. As can be seen in FIG. 9, in at least one embodiment the detected straight line is not a continuous straight line. As a matter of fact, parts of the detected interpolated straight line 902 are obstructed from the view of whichever device produced the video data 202 by the arm of the user 204, but the segmented parts of the detected interpolated straight line 902 that are within the view of whichever device produced the video data 202 are interpolated to be a single continuous line.

As stated previously, in one scenario, the arm of the user 204 is indicated as, or is indicated as part of the foreground region of the video data 202. One example motivation behind identifying the respective region associated with the detected interpolated straight line 902 (made up of sub-regions 904a-c) to be a noncontiguous region is to prevent the indicated foreground region of the video data 202 from being included within the identified disjointed region. FIG. 9 shows such an example.

The shape of the region associated with the detected interpolated straight line 902 may have been determined through use of a multi-step approach. In a first step, a rectangle with a length equal to that of the detected interpolated straight line 902 is selected (e.g., a length from the top of the bookcase 206 to the bottom of the bookcase 206). In a second step, any portion of the selected rectangle that overlaps with any indicated foreground (e.g., the arm of the user 204) is deselected. The remaining selected region is identified as the region made up of the noncontiguous sub-regions 904a-c (the remaining selected sub-regions are the identified region associated with the detected interpolated straight line 902).

In another embodiment, the sub-regions 904a-c are generated using the technique discussed in connection with FIG. 8. In such an embodiment, the systems and processes described herein do not interpolate the detected line 902. Instead, each segment of the detected straight line 902 is treated as a unique, unrelated detected straight line.

Figure 10:
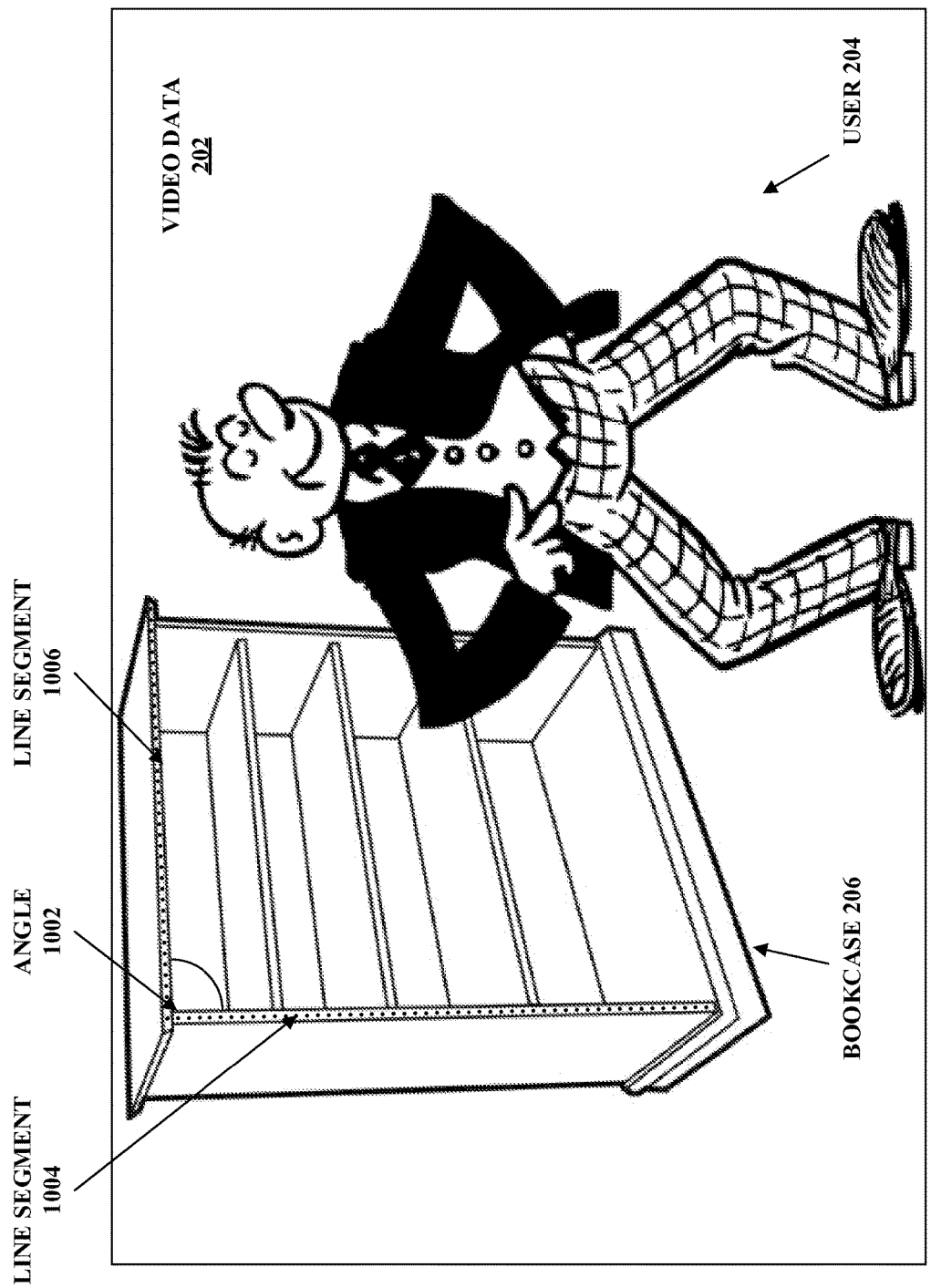
FIG. 10 depicts an example detected angle, in accordance with an embodiment.

FIG. 10 depicts a first example detected angle, in accordance with an embodiment. In particular, FIG. 10 depicts the video data 202 of FIG. 2 with a detected angle 1002. The detected angle 1002 is a corner of the bookcase 206. The detected angle 1002 is made up of two line segments 1004 and 1006. Various methods can be used to detect the angle 1002 within the video data 202. Many of the methods may initially detect the line segments 1004 and 1006 and then use the detected line segments 1004 and 1006 to detect the angle 1002. Numerous methods, such as corner finding using detected-line-segment-intersection recognition, are known by those with skill in the relevant art and it would be understood how to implement any of the known techniques for detecting angles within the video data 202 in the context of the disclosure herein.

In at least one embodiment, the set of geometric-primitive models includes an angle. In such an embodiment, the systems and methods described herein include detecting, if present within the video data 202, one or more angles (e.g., the angle 1002). In some cases every angle within the video data 202 is detected. This case is not depicted in any of the FIGS. due to the visual complexity, however it would be understood by those with skill in the art how to do so. In other embodiments not every angle within the video data 202 is detected, of which FIG. 10 is an example.

In at least one embodiment, the set of geometric-primitive models includes an angle within a threshold tolerance of being a right angle. In such an embodiment, the systems and methods described herein include detecting, if present within the video data 202, one or more angles within a threshold tolerance of being a right angle (e.g., the angle 1002). In some cases every angle within a threshold tolerance of being a right angle within the video data 202 is detected. In other embodiments not every angle within a threshold tolerance of being a right angle within the video data 202 is detected. In some formulation of this embodiment, every angle depicted in the video data 202 is detected, and those detected angles that are not within a threshold tolerance of being a right angle are thereafter disregarded. Stated formally, in some embodiments, detecting, if present within the video data 202, one or more angles within a threshold tolerance of being a right angle includes (i) detecting, if present within the video data 202, one or more angles and (ii) disregarding those detected angles that are not longer than the threshold length.

In at least one embodiment, the set of geometric-primitive models includes an angle made up of two line segments, wherein each of the two line segments is longer than a threshold length. In such an embodiment, the systems and methods described herein include detecting, if present within the video data 202, one or more angles made up of two line segments (e.g., the angle 1002 made up of the line segments 1004 and 1006), wherein each of the two line segments is longer than the threshold length. In some cases every angle made up of two line segments, wherein each of the two line segments is longer than the threshold length within the video data 202 is detected. In other embodiments not every angle made up of two line segments, wherein each of the two line segments is longer than the threshold length within the video data 202 is detected. In some formulation of this embodiment, every angle depicted in the video data 202 is detected, and those detected angles that are not made up of two line segments that are each longer than the threshold length are thereafter disregarded. Stated formally, in some embodiments, detecting, if present within the video data 202, one or more angle made up of two line segments, wherein each of the two line segments is longer than the threshold length includes (i) detecting, if present within the video data 202, one or more angles and (ii) disregarding those detected angles that are not made up of two line segments that are each longer than the threshold length.

Figure 11:
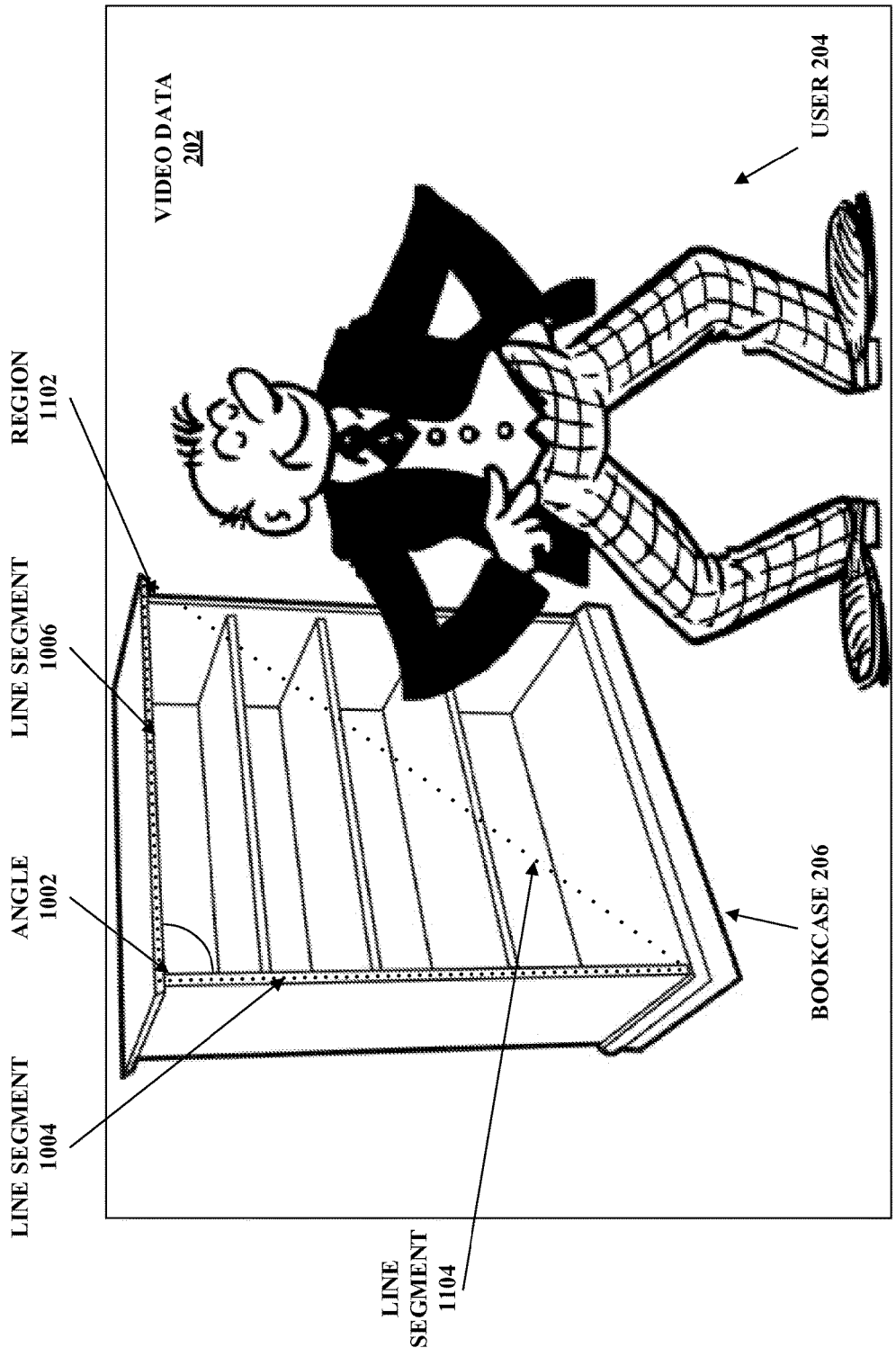
FIG. 11 depicts a first example identified region associated with the example angle line of FIG. 10, in accordance with an embodiment.

FIG. 11 depicts a first example identified region associated with the example angle of FIG. 10, in accordance with an embodiment. In particular, FIG. 11 depicts the video data 202 of FIG. 2 and the detected angle 1002 of FIG. 10. FIG. 11 further depicts an identified region 1102 associated with the detected angle 1002. An identified region associated with the detected 1002 may take on a plurality of shapes, a few examples of which are described below.

In at least one embodiment, as depicted in FIG. 11, the region 1102, within the video data 202, associated with the detected angle 1002 is a triangle. In some instances, as depicted in FIG. 11, the triangle (i.e., the region 1102) is made up of the two line segments 1004 and 1006 that form the detected angle 1002 and one line segment 1104 that connects the two line segments 1004 and 1006. In at least one such instance, the line segment 1104 connects endpoints of the two line segments 1004 and 1006, an example of which is depicted in FIG. 11. In at least one other instance, the line segment 1104 connects two non-endpoints of the two line segments 1004 and 1006 (this particular example is not depicted in any of the FIGS. but would be well understood without visual aid by those with skill in the relevant art). In at least one other instance, the line segment 1104 connects one endpoint with one non-endpoint (this particular example is not depicted in any of the FIGS. but would also be well understood without visual aid by those with skill in the relevant art).

Figure 12:
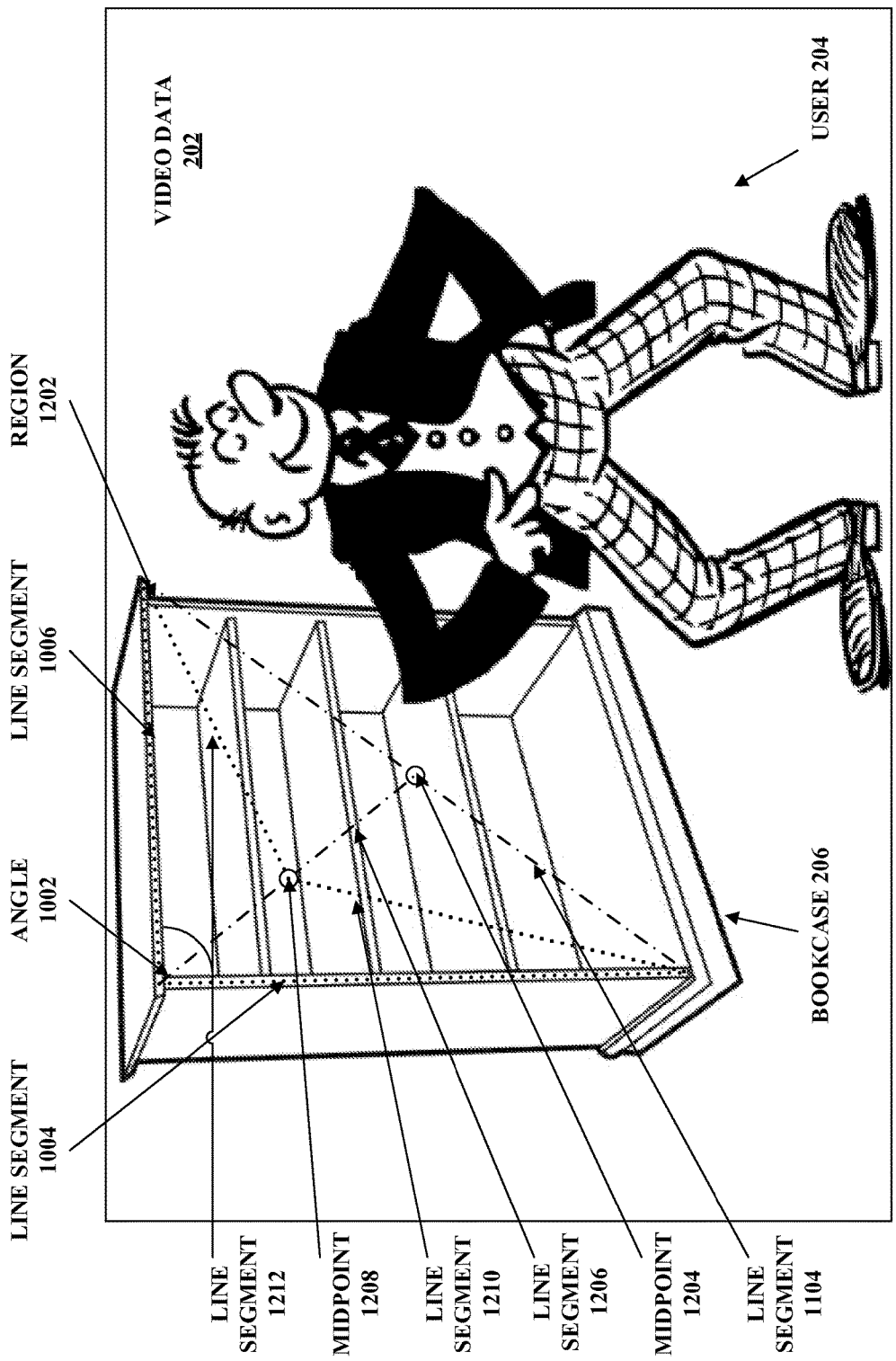
FIG. 12 depicts a second example identified region associated with the example detected angle of FIG. 10, in accordance with an embodiment.

FIG. 12 depicts a second example identified region associated with the example detected angle of FIG. 10, in accordance with an embodiment. In particular, FIG. 12 depicts the video data 202 of FIG. 2 and the detected angle 1002 of FIG. 10. FIG. 12 further depicts an identified region 1202 associated with the detected angle 1002. An identified region associated with the detected angle 1002 may take on a plurality of shapes.

In at least one embodiment, as depicted in FIG. 12, the region 1202, within the video data 202, associated with the detected angle 1002 is a sub-region of a triangle that is made up of the two line segments 1004 and 1006 that form the detected angle 1002 and one line segment 1104 that connects the two line segments that form the detected angle 1002 (e.g., a sub-region of the region 1102 of FIG. 11). The sub-region may be a quadrilateral sub-region formed by two triangular sub-regions sharing one common side, such as the region 1202 depicted in FIG. 12.

The shape of the region 1202 may be determined through use of a multi-step approach. In a first step, a triangle that is made up of the two line segments 1004 and 1006 that form the detected angle 1002 and the one line segment 1104 that connects the two line segments 1004 and 1006 (i.e., the region 1102 of FIG. 11) is selected. In a second step, a midpoint 1204 of the line segment 1104 is identified. In a third step, a line segment 1206 that connects the midpoint 1204 with a vertex of the detected angle 1002 is identified. In a fourth step, a midpoint 1208 of the line segment 1206 is identified. In a fifth step, a line segment 1210 that connects the midpoint 1208 with a point on the line segment 1004 is identified. The point on the line segment 1004 may be an endpoint or a non-endpoint. In a sixth step, a line segment 1212 that connects the midpoint 1208 with a point on the line segment 1006 is identified. The point on the line segment 1006 may be an endpoint or a non-endpoint. In a seventh step, a region bounded by the line segments 1004, 1006, 1210, and 1212 (i.e., the region 1202) is selected as the region associated with the detected angle 1002.

Figure 13:
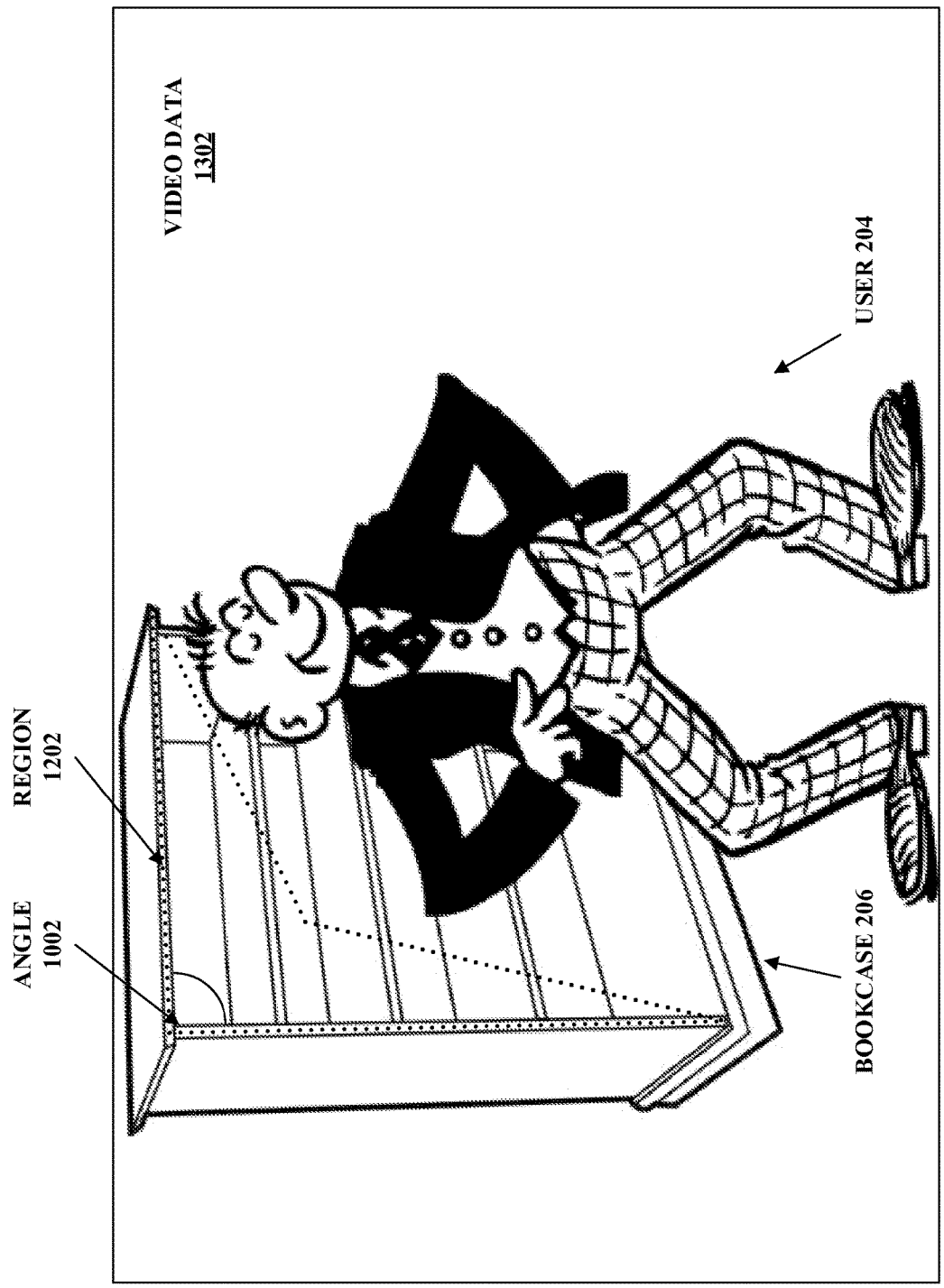
FIG. 13 depicts a second example frame of video data and highlights the benefits of employing a quadrilateral region, in accordance with an embodiment.

FIG. 13 depicts a second example frame of video data and highlights the benefits of employing a quadrilateral sub-region of the triangular region 1102 of FIG. 11, in accordance with an embodiment. In particular FIG. 13 depicts a video frame 1302 that includes the user 204, the bookcase 206, the detected angle 1002, and a region 1202 that is a quadrilateral sub region of the triangular region 1102 of FIG. 11. The video data 1302 differs from the video data 202 in that in the video data 1302 the user 204 is further to the left of the scene. If the region 1102 is used as the identified region associated with the detected angle 1002 then the identified region associated with the angle would overlap with the user 204. However, if the region 1202 is used as the identified region associated with the detected angle 1002 then no part of the identified region associated with the detected angle 1002 will overlap with the user 204. The latter may be preferred in examples wherein all or part of the user 204 is indicated as foreground.

Figure 14:
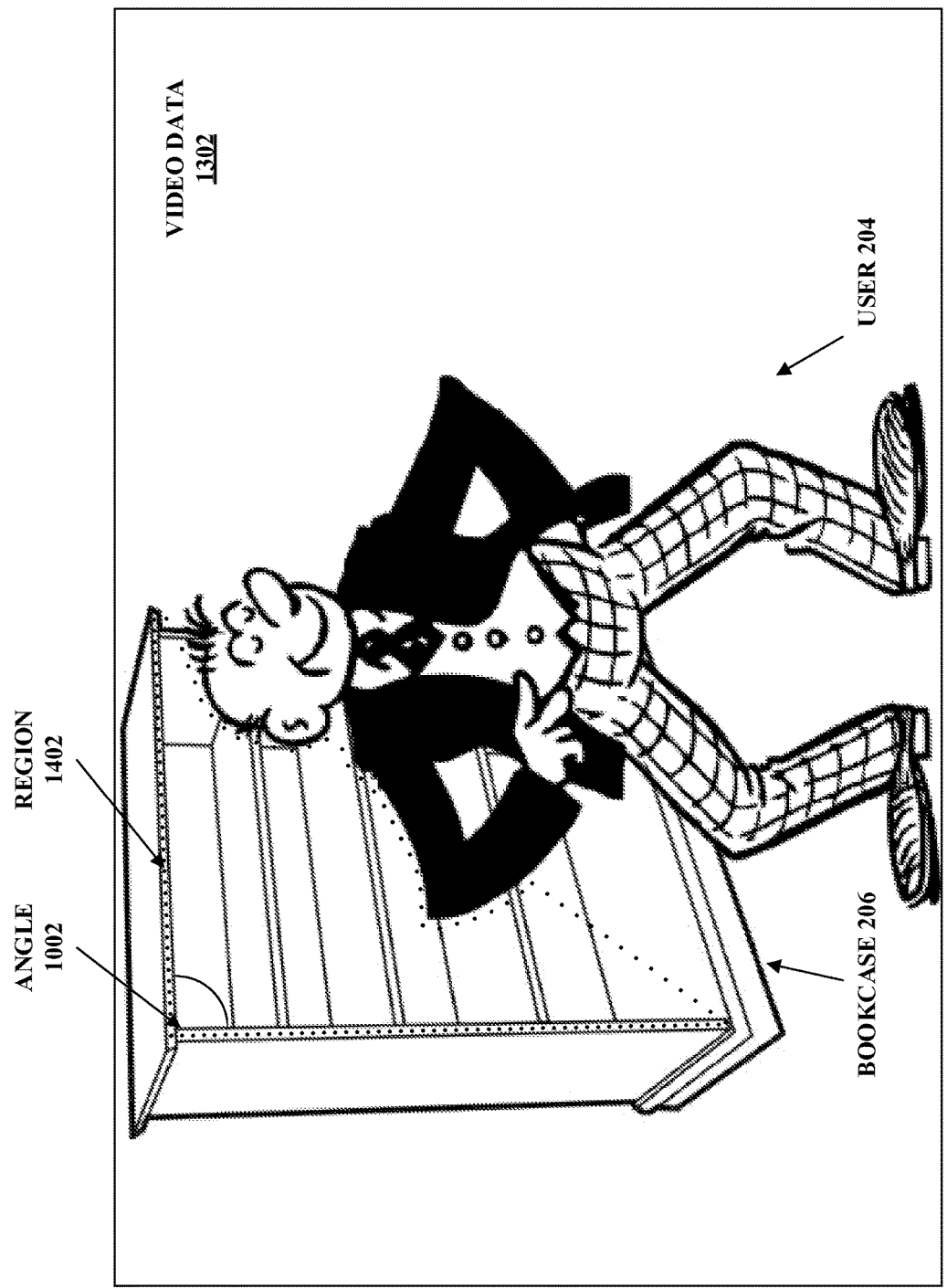
FIG. 14 depicts the second example frame of video data of FIG. 13 and a non-polygonal identified region, in accordance with an embodiment.

FIG. 14 depicts the second example frame of video data of FIG. 13 and a non-polygonal identified region, in accordance with an embodiment. In particular, FIG. 14 depicts the video data 1302 of FIG. 13 that includes the user 204, the bookcase 206, the detected angle 1002, and a region 1402.

In at least one embodiment, as depicted in FIG. 14, the region 1402, within the video data 1302, associated with the detected angle 1002 is not a triangle nor a quadrilateral sub-region of a triangle, it is a non-polygonal region.

In at least one scenario, the user 204 is indicated as, or is indicated as part of the foreground region of the video data 1302. One example motivation behind identifying the region 1402 as depicted in FIG. 14 is to prevent the indicated foreground region of the video data 1302 from being included within the identified region 1402. FIG. 14 shows such an example.

The shape of the region 1402 may be determined through use of a multi-step approach. In a first step, a triangle that is made up of the two line segments 1004 and 1006 that form the detected angle 1002 and the one line segment 1104 that connects the two line segments 1004 and 1006 (i.e., the region 1102 of FIG. 11) is selected. In a second step, any portion of the selected triangle (i.e., the region 1102) that overlaps with any indicated foreground (e.g., the user 204) is deselected. The remaining selected region is identified as the region 1402 (i.e., the remaining selected region is the identified region associated with the detected angle 1002).

Figure 15:
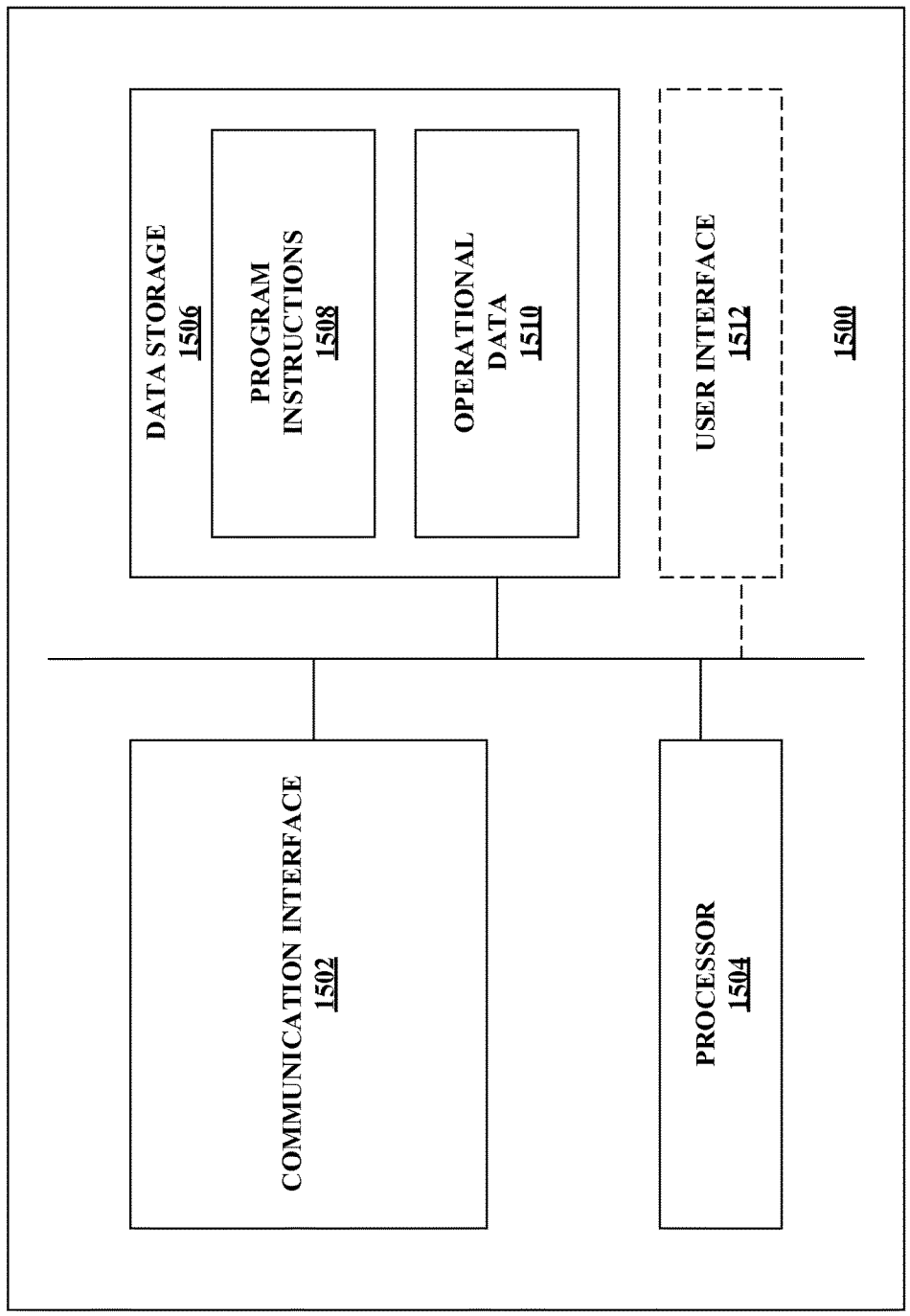
FIG. 15 depicts an example computing and communication device (CCD), in accordance with an embodiment.

FIG. 15 depicts an example computing and communication device (CCD), in accordance with an embodiment. In the embodiment that is depicted in FIG. 15, an example CCD 1500 includes a communication interface 1502, a processor 1504, and data storage 1506 containing instructions 1508 executable by the processor 1504 for causing the CCD 1500 to carry out a set of functions, which may include those functions described above in connection with FIG. 1. As a general matter, the example CCD 1500 is presented as an example system that could be programmed and configured to carry out the functions described herein.

The communication interface 1502 may include one or more wireless-communication interfaces (for communicating according to, e.g., APCO P25, TETRA, DMR, LTE, Wi-Fi, NFC, Bluetooth, and/or one or more other wireless-communication protocols) and/or one or more wired-communication interfaces (for communicating according to, e.g., Ethernet, USB, eSATA, IEEE 1394, and/or one or more other wired-communication protocols). As such, the communication interface 1502 may include any necessary hardware (e.g., chipsets, antennas, Ethernet cards, etc.), any necessary firmware, and any necessary software for conducting one or more forms of communication with one or more other entities as described herein. The processor 1504 may include one or more processors of any type deemed suitable by those of skill in the relevant art, some examples including a general-purpose microprocessor and a dedicated digital signal processor (DSP).

The data storage 1506 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 15, the data storage 1506 contains program instructions 1508 executable by the processor 1504 for carrying out various functions, and also contains operational data 1510, which could include any one or more types of data stored and/or accessed by the example CCD 1500 during operation. In embodiments in which a computing system such as the example CCD 1500 is arranged, programmed, and configured to carry out processes such as the example process that is described above in connection with FIG. 1, the program instructions 1508 are executable by the processor 1504 for carrying out those functions; in instances where other entities described herein have a structure similar to that of the example CCD 1500, the respective program instructions 1508 for those respective devices are executable by their respective processors 1504 to carry out functions respectively performed by those devices.

If present, the user interface 1512 may include one or more input devices (a.k.a. components and the like) and/or one or more output devices (a.k.a. components and the like). With respect to input devices, the user interface 1512 may include one or more touchscreens, buttons, switches, microphones, and the like. With respect to output devices, the user interface 1512 may include one or more displays, speakers, light emitting diodes (LEDs), and the like. Moreover, one or more components (e.g., an interactive touchscreen-and-display component) of the user interface 1512 could provide both user-input and user-output functionality. And certainly other user-interface components could be used in a given context, as known to those of skill in the art. Furthermore, the CCD 1500 may include one or more video cameras, depth cameras, 3-D cameras, infrared-visible cameras, light-field cameras or a combination thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
obtaining video data comprising at least one frame of pixel data and depicting at least a portion of a user;
processing the video data with at least one persona identification module to generate at least one persona probability map, the at least one persona identification module comprising a geometric primitive module for generating a first persona probability map at least in part by:

detecting at least one geometric primitive depicted within the video data, wherein the at least one detected geometric primitive is a type of geometric primitive included in a set of geometric-primitive models;
    identifying a respective region within the video data associated with each of the at least one detected geometric primitives; and
    assigning the respective regions an increased background-probability in the first persona probability map; and
    outputting a persona image depicting at least the portion of the user by extracting pixels from the at least one frame of pixel data based on the at least one persona probability map.

2. The method of claim 1, wherein obtaining the video data comprises obtaining the video data via at least one of a video camera, a depth camera, a 3-D camera, and a data store.

3. The method of claim 1, wherein the set of geometric-primitive models includes a straight line.

4. The method of claim 3, wherein:
    at least one of the detected geometric primitives is a straight line; and
    the respective region within the video data associated with the detected straight line is a rectangle.

5. The method of claim 4, wherein the rectangle (i) has a length that is equal to a length of the detected straight line and (ii) is bisected by the detected straight line.

6. The method of claim 4, wherein the rectangle (i) has a length that is less than a length of the detected straight line and (ii) is bisected by the detected straight line.

7. The method of claim 1, wherein the set of geometric-primitive models includes a straight line longer than a threshold length.

8. The method of claim 1, wherein the set of geometric-primitive models includes an angle.

9. The method of claim 8, wherein:
    at least one of the detected geometric primitives is an angle; and
    the respective region within the video data associated with the detected angle is a triangle that is made up of two line segments that form the detected angle and one line segment that connects the two line segments that form the detected angle.

10. The method of claim 8, wherein:
    at least one of the detected geometric primitives is an angle; and
    the respective region within the video data associated with the detected angle is a sub-region of a triangle that is made up of two line segments that form the detected angle and one line segment that connects the two line segments that form the detected angle.

11. The method of claim 10, wherein the sub-region is a quadrilateral sub-region formed by two triangular sub-regions sharing one common side.

12. The method of claim 1, wherein the set of geometric-primitive models include an angle within a threshold tolerance of being a right angle.

13. The method of claim 1, wherein the set of geometric-primitive models includes an angle made up of two line segments, wherein each of the two line segments is longer than a threshold length.

14. The method of claim 1, further comprising updating a background-color model at least in part by using at least one identified respective region.

15. The method of claim 14, wherein updating the background-color model comprises:
    identifying a respective color of at least one pixel included in the at least one identified respective region; and
    adding to the background-color model the identified respective color of the at least one pixel.

16. The method of claim 1, wherein detecting at least one geometric primitive comprises edge detection using high-frequency-information recognition.

17. The method of claim 1, wherein the set of geometric-primitive models comprises at least one of: right angles, long straight lines, squares, triangles, and circles.

18. The method of claim 1, wherein the set of geometric-primitive models define shapes or geometric structures that are not part of an extracted persona.

19. A system comprising:
    a communication interface;
    a processor; and
    computer-readable non-transitory data storage containing instructions executable by the processor for causing the system to carry out a set of functions, the set of functions including:
        obtaining video data comprising at least one frame of pixel data and depicting at least a portion of a user;
        processing the video data with at least one persona identification module to generate at least one persona probability map, the at least one persona identification module comprising a geometric primitive module for generating a first persona probability map at least in part by:
            detecting at least one geometric primitive depicted within the video data, wherein the at least one detected geometric primitive is a type of geometric primitive included in a set of geometric-primitive models;
            identifying a respective region within the video data associated with each of the at least one detected geometric primitives; and
            assigning the respective regions an increased background-probability in the first persona probability map; and
        outputting a persona image depicting at least the portion of the user by extracting pixels from the at least one frame of pixel data based on the at least one persona probability map.

* * * * *